United States Patent
Martin et al.

(10) Patent No.: US 12,099,570 B2
(45) Date of Patent: *Sep. 24, 2024

(54) SYSTEM AND METHODS FOR FASTER PROCESSOR COMPARISONS OF VISUAL GRAPH FEATURES

(71) Applicant: Palantir Technologies Inc., Denver, CO (US)

(72) Inventors: Christopher Martin, Minneapolis, MN (US); Abdulaziz Alghunaim, Mountain View, CA (US); Sri Krishna Vempati, Santa Clara, CA (US)

(73) Assignee: Palantir Technologies Inc., Denver, CO (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/650,923

(22) Filed: Feb. 14, 2022

(65) Prior Publication Data

US 2022/0164394 A1    May 26, 2022

Related U.S. Application Data

(63) Continuation of application No. 15/997,548, filed on Jun. 4, 2018, now Pat. No. 11,281,726.
(Continued)

(51) Int. Cl.
*G06F 16/901* (2019.01)
*G06F 16/9032* (2019.01)
(Continued)

(52) U.S. Cl.
CPC ............ *G06F 18/00* (2023.01); *G06F 16/901* (2019.01); *G06F 16/90328* (2019.01);
(Continued)

(58) Field of Classification Search
CPC .................. G06F 16/901; G06F 16/90328
(Continued)

(56) References Cited

U.S. PATENT DOCUMENTS 5,532,717 A    7/1996    Jones et al.
5,724,575 A    3/1998    Hoover et al.
(Continued)

FOREIGN PATENT DOCUMENTS

AU    2014206155    12/2015
CN    102054015    5/2014
(Continued)

OTHER PUBLICATIONS

Pratt, Kevin. "Search for Patterns in Compressed Time Series." International Journal of Image and Graphics. Aug. 13, 2017. 18 pages. http://web.archive.org/web/20170813185824/https://www.cs.cmu.edu/~eugene/research/full/search-series.pdf (Year: 2017).*
(Continued)

*Primary Examiner* — Kimberly L Wilson
(74) *Attorney, Agent, or Firm* — Knobbe, Martens, Olson & Bear, LLP

(57) ABSTRACT

Techniques allow a computer to responsively search for graph shapes similar to a user-selected graph shape much faster. Data can be pre-processed and stored as vectors, along with an index. The index can be used to find similar vectors that represent graph shapes similar to a user-selected shape in a computationally efficient manner. Vectors of multiple resolutions can be used to anticipate different sizes of a graph that a user can select, and comparisons can be repeated and refined. When a satisfactorily small number of candidate vectors are determined, more computationally intensive distance calculations can be performed on data reconstructed from the vectors.

20 Claims, 10 Drawing Sheets

Related U.S. Application Data

(60) Provisional application No. 62/593,815, filed on Dec. 1, 2017.

(51) Int. Cl.
*G06F 17/14* (2006.01)
*G06F 17/18* (2006.01)
*G06F 18/00* (2023.01)
*G06F 18/2413* (2023.01)

(52) U.S. Cl.
CPC .............. *G06F 17/14* (2013.01); *G06F 17/18* (2013.01); *G06F 18/24147* (2023.01); *G06F 2218/08* (2023.01); *G06F 2218/16* (2023.01)

(58) Field of Classification Search
USPC ......................................................... 707/722
See application file for complete search history.

(56) References Cited

U.S. PATENT DOCUMENTS

| | | |
|---|---|---|
| 5,872,973 A | 2/1999 | Mitchell et al. |
| 5,897,636 A | 4/1999 | Kaeser |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,609,085 B1 | 8/2003 | Uemura et al. |
| 6,745,382 B1 | 6/2004 | Zothner |
| 6,976,210 B1 | 12/2005 | Silva et al. |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,233,843 B2 | 6/2007 | Budhraja et al. |
| 7,461,158 B2 | 12/2008 | Rider et al. |
| 7,617,232 B2 | 11/2009 | Gabbert et al. |
| 7,667,582 B1 | 2/2010 | Waldorf |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,844,892 B2 | 11/2010 | Shewchenko et al. |
| 7,917,376 B2 | 3/2011 | Bellin et al. |
| 7,941,321 B2 | 5/2011 | Greenstein et al. |
| 7,962,495 B2 | 6/2011 | Jain et al. |
| 7,984,374 B2 | 7/2011 | Caro et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,054,756 B2 | 11/2011 | Chand et al. |
| 8,060,259 B2 | 11/2011 | Budhraja et al. |
| 8,112,425 B2 | 2/2012 | Baum et al. |
| 8,126,848 B2 | 2/2012 | Wagner |
| 8,185,819 B2 | 5/2012 | Sah et al. |
| 8,229,902 B2 | 7/2012 | Vishniac et al. |
| 8,302,855 B2 | 11/2012 | Ma et al. |
| 8,401,710 B2 | 3/2013 | Budhraja et al. |
| 8,484,115 B2 | 7/2013 | Aymeloglu et al. |
| 8,504,542 B2 | 8/2013 | Chang et al. |
| 8,589,273 B2 | 11/2013 | Creeden et al. |
| 8,676,857 B1 | 3/2014 | Adams et al. |
| 8,812,960 B1 | 8/2014 | Sun et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,195,700 B1 | 11/2015 | Becker |
| 9,208,159 B2 | 12/2015 | Stowe et al. |
| 9,230,280 B1 | 1/2016 | Maag et al. |
| 9,280,532 B2 | 3/2016 | Cicerone |
| 9,672,257 B2 | 6/2017 | Tobin et al. |
| 9,753,935 B1 | 9/2017 | Tobin et al. |
| 10,452,651 B1 | 10/2019 | Palou |
| 10,839,309 B2 * | 11/2020 | Kokkinis ............... G10L 21/028 |
| 11,281,726 B2 | 3/2022 | Martin et al. |
| 11,314,738 B2 | 4/2022 | Palou |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2002/0095360 A1 | 7/2002 | Joao |
| 2002/0095658 A1 | 7/2002 | Shulman |
| 2002/0103705 A1 | 8/2002 | Brady |
| 2002/0141652 A1 | 10/2002 | Charrier et al. |
| 2002/0147805 A1 | 10/2002 | Leshem et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0034570 A1 | 2/2004 | Davis |
| 2004/0086186 A1 | 5/2004 | Sun |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2004/0153418 A1 | 8/2004 | Hanweck |
| 2005/0010472 A1 | 1/2005 | Quatse et al. |
| 2005/0086207 A1 | 4/2005 | Heuer et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0131990 A1 | 6/2005 | Jewell |
| 2005/0289524 A1 | 12/2005 | McGinnes |
| 2006/0026120 A1 | 2/2006 | Carolan et al. |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106783 A1 | 5/2006 | Saffer et al. |
| 2006/0106847 A1 | 5/2006 | Eckardt et al. |
| 2006/0116991 A1 | 6/2006 | Calderwood |
| 2006/0143075 A1 | 6/2006 | Carr et al. |
| 2006/0143079 A1 | 6/2006 | Basak et al. |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0277230 A1 | 12/2006 | Nishizawa et al. |
| 2006/0288035 A1 | 12/2006 | Viavant |
| 2007/0000999 A1 | 1/2007 | Kubo et al. |
| 2007/0011304 A1 | 1/2007 | Error |
| 2007/0050429 A1 | 3/2007 | Goldring et al. |
| 2007/0061487 A1 | 3/2007 | Moore et al. |
| 2007/0143108 A1 | 6/2007 | Kurozumi et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0271317 A1 | 11/2007 | Carmel |
| 2007/0284433 A1 | 12/2007 | Domenica et al. |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270316 A1 | 10/2008 | Guidotti et al. |

(56) References Cited

U.S. PATENT DOCUMENTS

| | | |
|---|---|---|
| 2008/0301378 A1 | 12/2008 | Carrie |
| 2008/0313132 A1 | 12/2008 | Hao et al. |
| 2009/0031247 A1 | 1/2009 | Walter et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0125459 A1 | 5/2009 | Norton et al. |
| 2009/0164387 A1 | 6/2009 | Armstrong et al. |
| 2009/0177962 A1 | 7/2009 | Gusmorino et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254971 A1 | 10/2009 | Herz |
| 2009/0271343 A1 | 10/2009 | Vaiciulis et al. |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2009/0319418 A1 | 12/2009 | Herz |
| 2010/0036831 A1 | 2/2010 | Vemuri et al. |
| 2010/0042922 A1 | 2/2010 | Bradeteanu et al. |
| 2010/0057622 A1 | 3/2010 | Faith et al. |
| 2010/0070489 A1 | 3/2010 | Aymeloglu et al. |
| 2010/0070842 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191563 A1 | 7/2010 | Schlaifer et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0231595 A1 | 9/2010 | Dang et al. |
| 2010/0235606 A1 | 9/2010 | Oreland et al. |
| 2010/0283787 A1 | 11/2010 | Hamedi et al. |
| 2010/0306193 A1 | 12/2010 | Pereira et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0061013 A1 | 3/2011 | Billicki et al. |
| 2011/0078173 A1 | 3/2011 | Seligmann et al. |
| 2011/0099133 A1 | 4/2011 | Chang et al. |
| 2011/0153384 A1 | 6/2011 | Horne et al. |
| 2011/0153592 A1 | 6/2011 | DeMarcken |
| 2011/0173619 A1 | 7/2011 | Fish |
| 2011/0184813 A1 | 7/2011 | Barne et al. |
| 2011/0218978 A1 | 9/2011 | Hong et al. |
| 2011/0238659 A1 | 9/2011 | Chittar et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2011/0314007 A1 | 12/2011 | Dassa et al. |
| 2012/0011238 A1 | 1/2012 | Rathod |
| 2012/0066166 A1 | 3/2012 | Curbera et al. |
| 2012/0072825 A1 | 3/2012 | Sherkin et al. |
| 2012/0079363 A1 | 3/2012 | Folting et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0150791 A1 | 6/2012 | Willson |
| 2012/0150925 A1 | 6/2012 | Gupta et al. |
| 2012/0159307 A1 | 6/2012 | Chung et al. |
| 2012/0173381 A1 | 7/2012 | Smith |
| 2012/0221553 A1 | 8/2012 | Wittmer et al. |
| 2012/0221589 A1 | 8/2012 | Shahar et al. |
| 2012/0272186 A1 | 10/2012 | Kraut |
| 2012/0323888 A1 | 12/2012 | Osann, Jr. |
| 2012/0330908 A1 | 12/2012 | Stowe et al. |
| 2012/0330931 A1 | 12/2012 | Nakano et al. |
| 2013/0036346 A1 | 2/2013 | Cicerone |
| 2013/0060742 A1 | 3/2013 | Chang et al. |
| 2013/0066882 A1 | 3/2013 | Westbrooke |
| 2013/0096988 A1 | 4/2013 | Grossman et al. |
| 2013/0097130 A1 | 4/2013 | Bingol et al. |
| 2013/0103657 A1 | 4/2013 | Ikawa et al. |
| 2013/0151388 A1 | 6/2013 | Falkenborg et al. |
| 2013/0151453 A1 | 6/2013 | Bhanot et al. |
| 2013/0166480 A1 | 6/2013 | Popescu et al. |
| 2013/0238616 A1 | 9/2013 | Rose et al. |
| 2013/0238619 A1 | 9/2013 | Hanaoka et al. |
| 2013/0246170 A1 | 9/2013 | Gross et al. |
| 2013/0263019 A1 | 10/2013 | Castellanos et al. |
| 2013/0268533 A1 | 10/2013 | Komarov |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318060 A1 | 11/2013 | Chang et al. |
| 2014/0012796 A1 | 1/2014 | Petersen et al. |
| 2014/0040276 A1 | 2/2014 | Chen et al. |
| 2014/0040371 A1 | 2/2014 | Gurevich et al. |
| 2014/0068487 A1 | 3/2014 | Steiger et al. |
| 2014/0095509 A1 | 4/2014 | Patton |
| 2014/0095543 A1 | 4/2014 | Hsiao et al. |
| 2014/0101139 A1 | 4/2014 | Gemert et al. |
| 2014/0108380 A1 | 4/2014 | Gotz et al. |
| 2014/0108985 A1 | 4/2014 | Scott et al. |
| 2014/0136285 A1 | 5/2014 | Carvalho |
| 2014/0149272 A1 | 5/2014 | Hirani et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0247946 A1 | 9/2014 | Sen et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186338 A1 | 7/2015 | Mirra et al. |
| 2015/0186434 A1 | 7/2015 | Eichinger et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0088013 A1 | 3/2016 | Watson et al. |
| 2016/0164912 A1 | 6/2016 | Del Fante |
| 2016/0253679 A1 | 9/2016 | Venkatraman et al. |
| 2016/0275432 A1 | 9/2016 | Guinness et al. |
| 2016/0328432 A1 | 11/2016 | Raghunathan |
| 2016/0371363 A1 | 12/2016 | Muro et al. |
| 2017/0270172 A1 | 9/2017 | Tobin et al. |
| 2017/0355036 A1 | 12/2017 | Rozmarynowski et al. |
| 2018/0039651 A1 | 2/2018 | Tobin et al. |
| 2018/0181629 A1 | 6/2018 | Stowe et al. |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| EP | 0652513 | 5/1995 |
| EP | 1126384 | 8/2001 |
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3343403 | 7/2018 |

(56) References Cited

FOREIGN PATENT DOCUMENTS

| EP | 3493109 | 6/2019 |
| JP | 2004348594 A | * 12/2004 |
| WO | WO 2008/043082 | 4/2008 |
| WO | WO 2012/025915 | 3/2012 |
| WO | WO 2014/019349 | 2/2014 |

OTHER PUBLICATIONS

English Version of JP 2004-348594 A (Year: 2004).*
Official Communication for European Patent Application No. 18207202.5 dated Feb. 28, 2022, 5 pages.
"The Apache Cassandra Project," http://cassandra.apache.org/ Printed Sep. 14, 2011 in 3 pages.
"Apache HBase," http://hbase.apache.org/ printed Sep. 14, 2011 in 1 page.
Anonymous, "BackTult—JD Edwards One World Version Control System", in 1 page, Jul. 23, 2007.
Antoshenkov, Gennady, "Dictionary-Based Order-Preserving String Compression", The VLDB Journal, pp. 26-39, 1997.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Baker et al., "Megastore: Providing Scalable, Highly Available Storage for Interactive Services", 5th Biennial Conference on Innovative Data Systems Research (CIDR '11), Asilomar, California, pp. 223-234, Jan. 9-12, 2011.
Bernstein et al., "Hyder—A Transactional Record Manager for Shared Flash", 5th Biennial Conference on Innovative Data Systems Research (CIDR '11), vol. 12, Asilomar, California, pp. 9-20, Jan. 9-12, 2011.
Capptain—Pilot Your Apps, <http://www.capptain.com> Printed Jul. 18, 2013 in 6 pages.
Chang et al., "Bigtable: A Distributed Storage System for Structured Data", Google, Inc., OSDI'06:Seventh Symposium on Operating System Design and Implementation, Seattle, WA, pp. 1-14, Nov. 2006.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Countly Mobile Analytics, <http://count.ly/> Printed Jul. 18, 2013 in 9 pages.
Devanbu et al., "Authentic Third-party Data Publication", http://www.cs.ucdavis.edu/~devanbu/authdbpub.pdf, pp. 1-19, 2000.
Distimo—App Analytics, <http://www.distimo.com/app-analytics> Printed Jul. 18, 2013 in 5 pages.
Dreyer et al., "An Object-Oriented Data Model for a Time Series Management System", Proceedings of the 7th International Working Conference on Scientific and Statistical Database Management, 12 pages, Charlottesville, Virginia, USA, Sep. 28-30, 1994.
Elmasri et al., "Fundamentals of Database Systems", Fourth Edition, pp. 455-491, 2004.
Flurry Analytics, <http://www.flurry.com/> Printed Jul. 18, 2013 in 14 pages.
Google Analytics Official Website—Web Analytics & Reporting, <http://www.google.com/analytics.index.html> Printed Jul. 18, 2013 in 22 pages.
Hansen et al. "Analyzing Social Media Networks with NodeXL: Insights from a Connected World", Chapter 4, pp. 53-67 and Chapter 10, pp. 143-164, published Sep. 2010.
Hogue et al., "Thresher: Automating the Unwrapping of Semantic Content from the World Wide Web", 14th International Conference on World Wide Web, WWW 2005: Chiba, Japan, pp. 86-95, May 10-14, 2005.
Hua et al., "A Multi-attribute Data Structure with Parallel Bloom Filters for Network Services" HiPC 2006, LNCS 4297, pp. 277-288, 2006.
Keylines.com, "An Introduction to Keylines and Network Visualization," Mar. 2014.
Keylines.com, "Keylines Datasheet," Mar. 2014, <http://keylines.com/wp-content/uploads/2014/03/Keylines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing- Threats1.pdf> downloaded May 12, 2014 in 10 pages.
Klemmer et al., "Where Do Web Sites Come From? Capturing and Interacting with Design History," Association for Computing Machinery, CHI 2002, Apr. 20-25, 2002, Minneapolis, MN, 8 pages.
Kokossi et al., "D7-Dynamic Ontology Management System (Design)", Information Societies Technology Programme, pp. 1-27, Oct. 2002.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Mixpanel—Mobile Analytics, <https://mixpanel.com/> Printed Jul. 18, 2013 in 13 pages.
Niepert et al., "A Dynamic Ontology for a Dynamic Reference Work", Joint Conference on Digital Libraries, 10 pages, Vancouver, British Columbia, Jun. 17-22, 2007.
Nierman, "Evaluating Structural Similarity in XML Documents", 6 pages, 2002.
Open Web Analytics (OWA), <http://www.openwebanalytics.com/> Printed Jul. 19, 2013 in 5 pages.
Peng et al., "Large-scale Incremental Processing Using Distributed Transactions and Notifications",Proceedings of the 9th USENIX Symposium on Operating Systems Design and Implementation, USENIX, pp. 1-14, 2010.
Piwik—Free Web Analytics Software. <http://piwik.org/> Printed Jul. 19, 2013 in 18 pages.
Quest, "Toad for Oracle 11.6—Guide to Using Toad", 162 pages, Sep. 24, 2012.
StatCounter—Free Invisible Web Tracker, Hit Counter and Web Stats, <http://statcounter.com/> Printed Jul. 19, 2013 in 17 pages.
TestFlight—Beta Testing on The Fly, <http://testflightapp.com/> Printed Jul. 18, 2013 in 3 pages.
Thomson et al., "The Case for Determinism in Database Systems", The 36th International Conferenceon Very Large Data Bases, Proceedings of the VLDB Endowment, vol. 3, Issue No. 1, 11 pages, Singapore, Sep. 13-17, 2010.
trak.io, <http://trak.io/> printed Jul. 18, 2013 in 3 pages.
UserMetrix, <http://usermetrix.com/android-analytics> printed Jul. 18, 2013 in 3 pages.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015, http://en.wikipedia.org/w/index.php?title=Federated_database_system&oldid=571954221, 6 pages.
Wollrath et al., "A Distributed Object Model for the Java System", Conference on Object-Oriented Technologies and Systems, pp. 219-231, Jun. 17-21, 1996.
Yang et al., "HTML Page Analysis Based on Visual Cues", A129, pp. 859-864, 2001.
Zhao et al.,"Exploratory Analysis of Time-Series with ChronoLenses," IEEE Transactions on Visualization and Computer Graphics, vol. 17, No. 12, Oct. 23, 2011, pp. 2422-2431.
Official Communication for European Patent Application No. 18207202.5 dated Apr. 18, 2019, 9 pages.

* cited by examiner

SYSTEM AND METHODS FOR FASTER PROCESSOR COMPARISONS OF VISUAL GRAPH FEATURES

RELATED APPLICATIONS

This application references various features of and is a continuation of U.S. patent application Ser. No. 15/997,548, filed on Jun. 4, 2018, which application claims the benefit of priority to U.S. provisional patent application No. 62/593,815, filed on Dec. 1, 2017, the entirety of which is hereby made a part of this specification as if set forth fully herein and is incorporated by reference herein for all purposes, for all that it contains.

TECHNICAL FIELD

The present disclosure relates to techniques for improving a computer's speed of making visual comparisons. More specifically, the present disclosure relates to improving computing speeds for comparing a selected section of one or more graphs against other graphs.

BACKGROUND

Computers have limited processing power. Although a typical CPU may have a frequency of several gigahertz, the CPU can still be too slow to perform certain tasks or take an impractically slow time to do so. For example, a computer may receive a stream of new data, but the CPU may not be fast enough to perform computations at the speed that new data is received and fall farther and farther behind in performing the computations. As another example, a user may attempt to use a computer to process a large amount of data, but the computer may take too long to respond, thereby frustrating the user. As a result, current computer systems are unable to process certain quantities of data within limited time frames. Similarly, many applications that involve large scale data processing are impossible for people to perform by hand.

While digital computers are designed to perform basic mathematical and logical operations, digital computers have great difficulty perform basic visual analysis. In many cases, computers cannot perform basic visual analysis at all. Indeed, a common technique to discern if a user is a computer or a human is to present a CAPTCHA picture requiring simple visual analysis, such as identifying pictures of animals or street signs. Even when visual analysis by computers is possible, computers may do so very slowly or require a specially designed system with massive amounts of resources. There remains room for improvement in enabling computers to perform visual analysis and in enabling computers to do so faster with fewer resources.

SUMMARY

Systems and methods for faster processor comparisons of visual graph features are disclosed herein. An aspect features a computer system includes one or more hardware computer processors configured to execute computer executable instructions in order to cause the system to: generate a first plurality of vectors that represent first sections of stored time series data; transmit, to a user computer, data for displaying a graph of a first time series data; receive, from the user computer, an indication of a user selection of the first time series data; determine a first vector representing at least a first portion of the user-selected section of the first time series data; perform one or more comparisons to determine candidate sections of the stored time series data, the one or more comparisons including at least a first comparison of some of the first plurality of vectors against the first vector to determine first candidate sections of the stored time series data; and transmit, for display on the user computer, results of the one or more comparison, the results including an indication of at least one of the candidate sections.

The computer system of the preceding paragraph can one, any combination, or all of the following features of this paragraph. The first plurality of vectors include: coefficients of results of a mathematical transformation of the first sections of stored time series data; and a normalization index. Generating the first plurality of vectors comprises performing a mathematical transform that includes at least one of: a Fourier transform, Chebyshev transform, or polynomial approximation. The one or more hardware computer processors are further configured to execute computer executable instructions in order to cause the system to: perform a reverse transform of the mathematical transform to construct an approximation of at least one of the candidate sections using vector data. The first comparison is performed by referencing an index. The one or more hardware computer processors are further configured to execute computer executable instructions in order to cause the system to, before receiving the indication of the user selection: generate an index based at least in part on a nearest neighbor computation or distance computation. The one or more hardware computer processors are further configured to execute computer executable instructions in order to cause the system to: generate a second plurality of vectors that represent the stored time series data at a finer resolution than represented by the first plurality of vectors. The one or more hardware computer processors are further configured to execute computer executable instructions in order to cause the system to: convert at least a second portion of the user-selected section of the first time series data into a second vector; determine a subset of the second plurality of vectors that are at least partially included in a candidate section of the first candidate sections and adjacent to a vector from the first plurality of vectors; and perform a comparison of the subset of the second plurality of vectors against the second vector to determine second candidate sections of the stored time series data, where the second candidate sections are more similar to the user-selected section of the first time series data than the first candidate sections that are not included in the second candidate sections. The first time series data can be the stored time series data. The first time series data is different from the stored time series data, and both the first time series data and the stored time series data are stored in a database. The stored time series data is transmitted to the system as streaming data from a sensor. The one or more hardware computer processors are further configured to execute computer executable instructions in order to cause the system to: compare the user-selected section to a candidate section; and compare the user-selected section to an offset section, wherein the offset section begins at a shifted time that is offset from a beginning time of the candidate section, and the shifted time is less than a time span of the candidate section. Comparing the user-selected section to a candidate section comprises calculating a first distance, deviation, or other statistical metric; and comparing the user-selected section to the offset section comprises calculating a second distance, deviation, or other statistical metric. The one or more hardware computer processors are further configured to execute computer executable instructions in order to cause the system to: perform one or more comparisons of at least a part of the user-selected section to a second plurality of vectors generated based at least in part on a second time series data that is different from the stored time series data, wherein the second plurality of vectors represent sections of the second time series data having time ranges that are included in time ranges of the candidate sections of the stored time series data.

An aspect features a system comprising one or more hardware computer processors configured to execute computer executable instructions in order to cause the system to: generate a first plurality of vectors that represent first sections of stored series data; transmit, to a user computer, data for displaying a graph of a first series data; receive, from the user computer, an indication of a user selection of the first series data; determine a first vector representing at least a first portion of the user-selected section of the first series data; perform one or more comparisons to determine candidate sections of the stored series data, the one or more comparisons including at least a first comparison of some of the first plurality of vectors against the first vector to determine first candidate sections of the stored series data; and transmit, for display on the user computer, results of the one or more comparison, the results including an indication of at least one of the candidate sections.

The computer system of the preceding paragraph can one, any combination, or all of the following features of this paragraph. The first plurality of vectors include: coefficients of results of a mathematical transformation of the first sections of stored series data. The one or more hardware computer processors are further configured to execute computer executable instructions in order to cause the system to: perform a reverse transform of the mathematical transform to construct an approximation of at least one of the candidate sections using vector data. The first comparison is performed by referencing an index. The one or more hardware computer processors are further configured to execute computer executable instructions in order to cause the system to: generate a second plurality of vectors that represent the stored series data at a finer resolution than represented by the first plurality of vectors; convert at least a second portion of the user-selected section of the first series data into a second vector; determine a subset of the second plurality of vectors that are at least partially included in a candidate section of the first candidate sections and adjacent to a vector from the first plurality of vectors; and perform a comparison of the subset of the second plurality of vectors against the second vector to determine second candidate sections of the stored series data, where the second candidate sections are more similar to the user-selected section of the first series data than the first candidate sections that are not included in the second candidate sections. The one or more hardware computer processors are further configured to execute computer executable instructions in order to cause the system to: compare the user-selected section to a candidate section; and compare the user-selected section to an offset section, wherein the offset section begins at a shifted phase that is offset from a beginning domain of the candidate section, and the shifted phase is less than a domain span of the candidate section.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (such as touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations like charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous), and various embodiments of the disclosure provide significant improvements over such technology. As another example, the solutions described herein can improve alerting technology. A system allows users to selected graph features without defining mathematical equations for this features, and alerts can be generated if real time streaming data is determined to be sufficiently visually similar to the selected graph features. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

DETAILED DESCRIPTION

Generally described, aspects of the present disclosure are directed to a system and method for finding sections of graphs that can have similar visual features to a user selected section of a graph. A user can select a section of the graph, and the system can automatically search through the same or other timeseries to find similar sections. The system can perform the search in a computationally efficient manner, and the system can do so without the user providing an equation or mathematical definition of the data included in the user selected section.

Uses and User Interfaces

Figure 1:
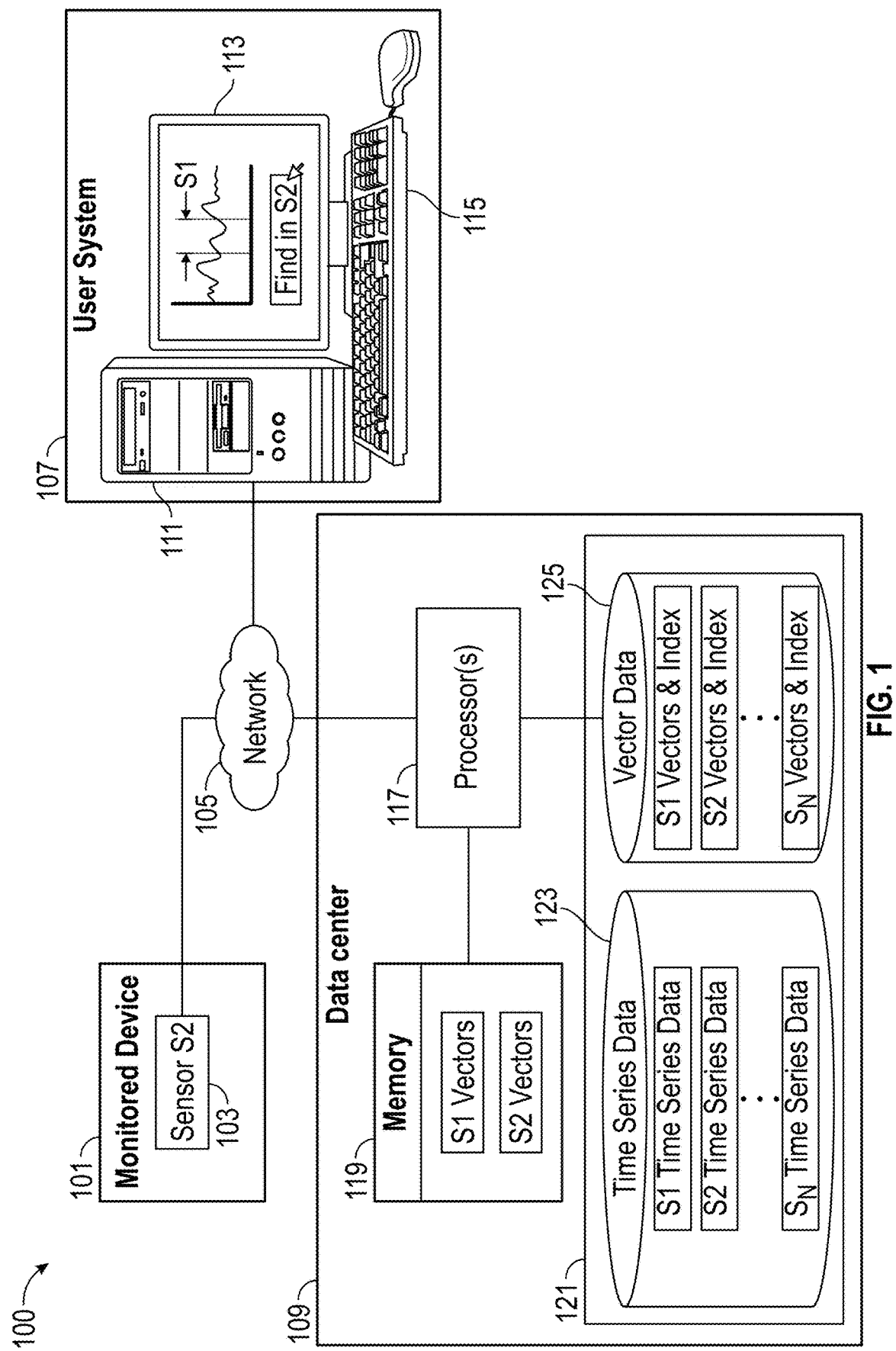
FIG. 1 shows an example system for improved processing of time series data.

FIG. 1 shows an example system 100 for computationally efficient processing of time series data. FIG. 1 includes a monitored device 101, a sensor 103, a network 105, a user system 107, and a datacenter 109. The user system 107 includes a computer 111, an output display device 113, and input devices 115 such as a mouse or keyboard. The datacenter 109 includes one or more processors 117, memory 119, and a data store 121. The data store can include a first database 123 of time series data and a second database 125 of vector data. Although some examples use time series data to provide more consistent examples to help understanding, it should be understood that the teachings herein can extend to any type of data, such as any graph data.

A sensor 103 can be used to collect data for a variety of monitored devices 101. For example, sensors can be used to collect temperature, pressure, size, volume, current, voltage, power, magnetic field, force, humidity, energy, speed, acceleration, flow rates, stress, tension, mass, weight, battery life, etc. It can be useful to monitor various devices including computer systems, machinery, cars, planes, boats, factories, power plants, electric grids, oil rigs, data centers, buildings, fields, production centers, infrastructure, delivery equipment, weather, etc. In some embodiments, the sensors can provide readings as time series data. Time series data can include measurements about the monitored device made each second or over a certain period of time, and the readings can be provided through a network 105 to the datacenter 109. The data can additionally or alternatively be provided to a user system 107 from the datacenter 109 or from the sensors 103.

As data is collected, the collected sensor data can be stored in a data store 121. The collected data can also be graphed and displayed through a display device 113 of the user system 107. Sometimes, a user can use a computer 111 to retrieve stored data from the data store 121 for display. Sometimes, sensor data can be streamed from the sensor 103 to the user system 107 and displayed in real time. Some techniques disclosed herein enable streaming sensor data to be processed and compared for visual features at a rate that can keep up with the rate that the streaming sensor data is received. A data store can include any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Vast amounts of sensor data can be collected and stored in a first database 123. For example, the first database 123 can store time series data from sensor S1, including data taken at different times for different lengths of time. The first database 123 can also store time series data from sensor S2, and so on. The first database 123 can store data for tens, hundreds, or thousands of sensors, or more. The first database 123 can store data for many different intervals, such as the sensor data collected for different intervals of seconds, minutes, hours, days, weeks, etc. The first database can store intervals of data collected over days, weeks, months, years, or other long periods of time. The sensors 103 can provide multiple data readings per second, such as 10 Hz, 100 Hz, 1 kHz, 1 MHz, 1 GHz, or faster. The amount of data collected can quickly exceed many gigabytes, terabytes, petabytes, or other amounts beyond which a processor can responsively analyze in response to a user command. A database can include any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

A second database 125 can store vector data. The vector data can include a first plurality of S1 vectors (e.g., as further discussed with respect to FIG. 5) that correspond to, represent, or are derived based at least in on sections of the S1 Time Series Data in the first database 123. The vector data can also include a second plurality of S2 vectors (e.g., as further discussed with respect to FIG. 5) that correspond to, represent, or are derived at least in part on sections of the S2 Time Series Data in the first database 123. The vector data can also include a search index for each of the pluralities of vector data to facilitate searching and comparisons of the vectors.

Users may collect and analyze sensor data for a variety of uses. In some cases, users may view a graph of sensor data (e.g., time series data from sensor S1) on the display device 113. For example, a sensor 101 on a battery device can take five voltage readings per second and report [0.55V, 0.54V, 0.55V, 0.56V, 0.57V] over the course of one second. As another example, a sensor 101 on a generator may report temperature data [(0.0 seconds, 50° C.); (0.7 seconds, 50° C.), (1.0 seconds, 51° C.), (1.5 seconds, 51° C.), etc.]. Other sensors 101 can report time series data at different consistent or variable rates, including hundreds or thousands of times per second. Other sensors can report other types of data besides time series data. In some systems, there can be many different sensors (e.g., sensor S1, sensor S2, . . . , sensor $S_N$) monitoring one device 101, or there can be many different sensors 103 monitoring many different devices.

After viewing the graph of sensor data, the user can select a section of the sensor data, such as a section of the presented S1 Time Series Data, in a user interface of the user system 107. In the user interface, the user can select to perform a search for other sections of the sensor data that look similar, such as further described with respect to FIG. 2. For example, the user can select a "Find in S2" search to be performed. The user can choose to search within the same sensor data or to search other sensor data. In some embodiments, such as further described with respect to FIG. 9, the user can select a section in a pair (or more) of graphs to find other pairs (or more) of sections that look similar.

Figure 2:
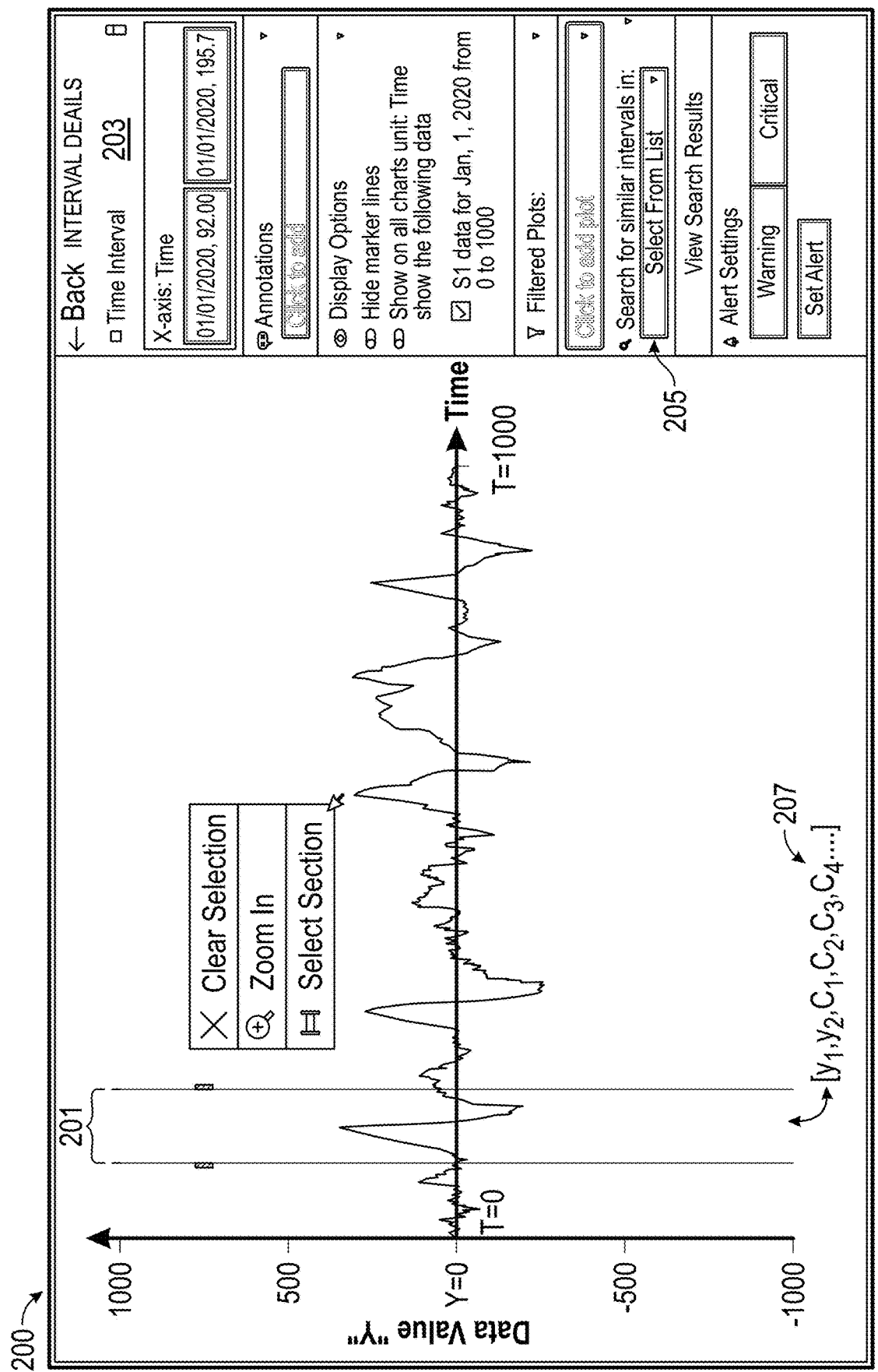
FIG. 2 shows an example user interface for selecting a section of a visual graph for comparison.

FIG. 2 shows examples of a user interface 200 that can be displayed on the display device 113. The user can select a section 201 of the graph having particular shapes or graphical features of interest. Details about the selected section can be indicated in a section 203 of the user interface 200. Then, the user can use a menu 205 to perform a search for other sections of the same or different graphs for similarly looking graphical features. For example, in geology, a geologist may view a sonar reading of the ground from a first sensor where a certain pattern indicated an oil deposit. The geologist may want to find similarly looking patterns in other sonar readings from sensors at other locations to find more oil deposits. As another example, an engineer at a power plant may monitor various indicators of the health of the power plant such as energy stored, energy generated, voltage, heat, current, generator speed, flywheel speed, etc. The engineer may want to compare the real-time health indicators for matches with indicators that preceded historical incidents (a generator malfunction, an overload, brownout, blackout, etc.) so that the engineer can respond.

In various embodiments, the user can select a section 201 of a first graph of data (e.g., senor data collected on Jan. 1, 2020 from a first sensor S1) and then perform a search for similarly looking sections in any of: the same graph being displayed, data from the same sensor (e.g., searching available data from the first sensor S1), or any other data (including data from other sensors such as S2 through $S_N$). The user can use the menu 205 to select which data to perform the search on. In some embodiments, the user can also specify additional search options, such as a number of matches to find, a section of a sensor data to search, which sensors or types of data to search, whether magnitude or shape are more important, and other options.

As explained further below, the search for a similarly looking feature can be performed by a computer system. Vector representations of sensor data can be determined, and an index indicating the similarity of vectors can be pre-computed before a user performs a search. In response to a search for a user selected section 201, the user selected section 201 can be converted into one or more vectors that represent subsets of the user selected section 201, and the index can be referenced to compare the subsets of the user selected section 201 to other vectors in a computationally efficient manner. As further discussed with respect to FIG. 5, the vector representation can include normalization factors for the range of the y-values and coefficients resulting from a transformation. As further discussed with respect to FIG. 6, initial candidate sections that might be similar to the user-selection section 201 can be determined. Additional comparisons based on vectors can be used to change, add to, or refine the list of candidate sections. The additional comparisons can be comparisons of vector representations of other subsets of the user-selected section 201, including neighboring subsets, smaller subsets, and/or phase-shifted subsets. Once a limited number of candidates are found, more computationally intensive similarity techniques can be used, such as calculating a distance as further discussed with respect to FIG. 7. One or more of the candidate sections can be selected and displayed in the user interface as the search results.

Figure 3:
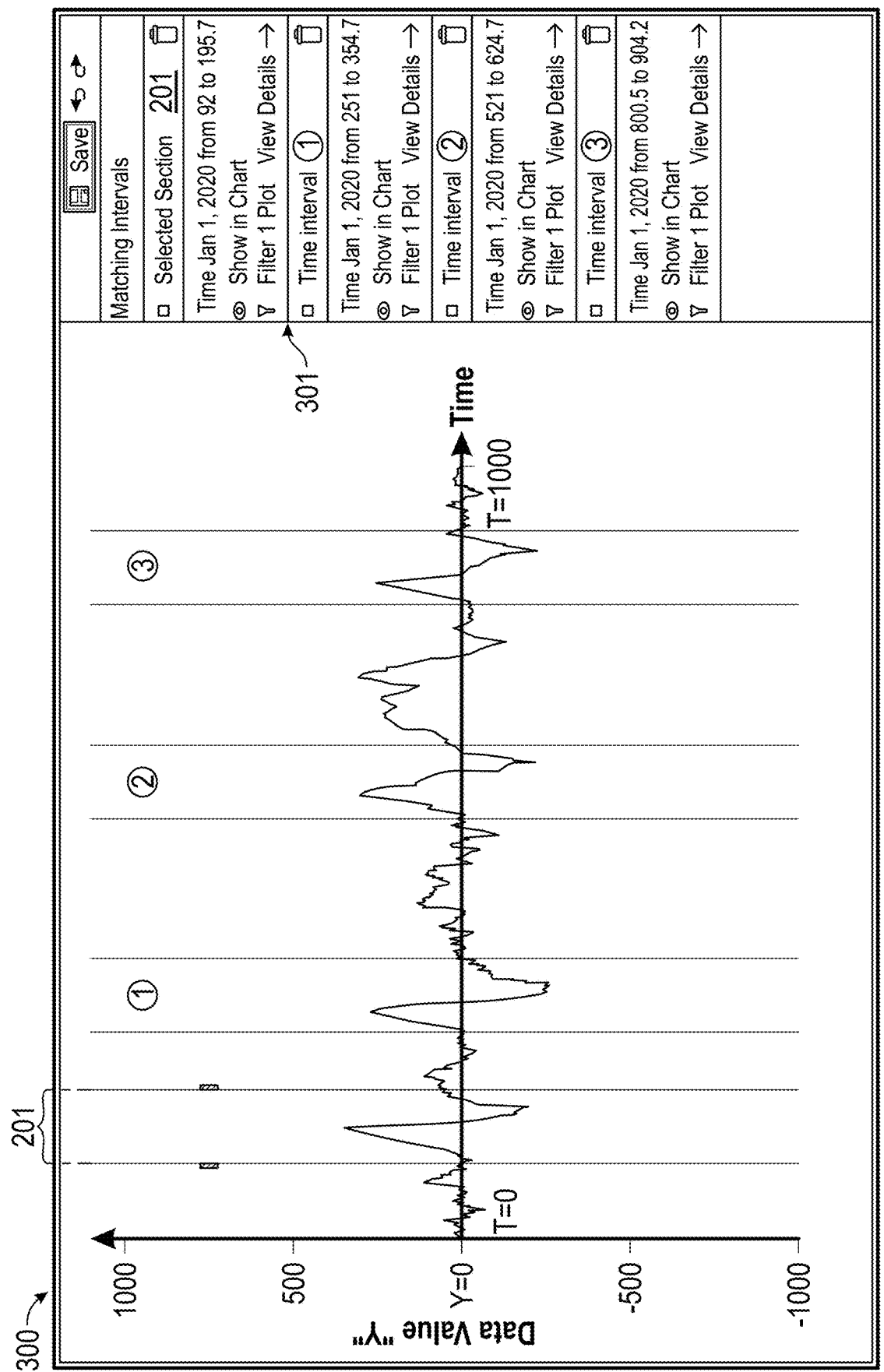
FIG. 3 shows an example user interface displaying the results of the comparison.

FIG. 3 shows an example user interface 300 showing search results (time intervals 1, 2, and 3) in response to the search performed in the user interface shown in FIG. 2. The search results can include a graphical display of the search results. In each time interval 1, 2, and 3, the graph starts at about Y=0, peaks up, drops to a minimum below Y=0, and returns to about Y=0. Accordingly, the shape of the graph in each of the time intervals 1, 2, and 3 can look similar to and/or have similar features to the shape of the graph in the user-selected section 201. The graphical display can include visual indications, such as highlighting or delimitation, of other sections of the graph that look similar to the user selected section 201. The search results can include a list 301 of results indicating which data (such as a path or filename of the data) includes a matching section and what subsets or sections of the data match (e.g., which time range or x-axis domain matches).

How to Process the User-Selected Section of a Graph for Comparison

Figure 9:
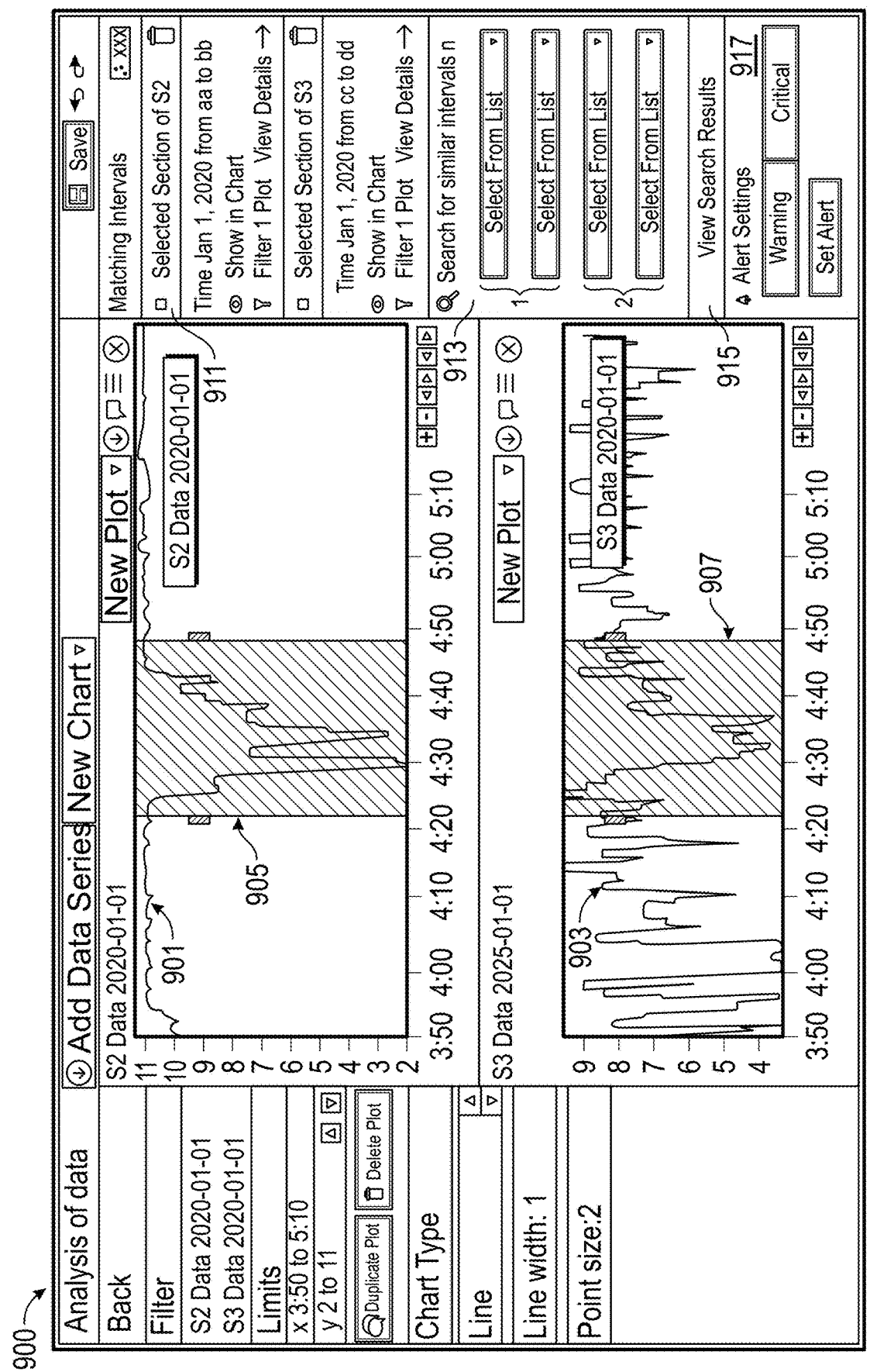
FIG. 9 shows an example user interface for searching for pairs of graph features similar to a selected pair of graph features.

A section of a graph can have a combination of peaks, valleys, swings, increase, decreases, and/or curves, which a user may be interested in. However, the user (or even a computer) may be unable to write a mathematical equation of the shape for a computer to search against. Although a computer can compare an equation to other data in the data store 121, real-world sensor data rarely, if ever, fits into easily expressible algebraic functions such as y=mX+b. For example, FIG. 9 shows features in waveforms that are not easily expressed. Accordingly, human users may be unable to come up with an equation to tell the computer what visual feature to search.

Additionally, unlike humans, computers lack the inherent ability to make visual comparisons of one graph to another. Although a computer's instruction set architecture (such as the X86 architecture, a MIPS architecture, a RISC architecture, an ARM architecture) may include operations such as addition, subtraction, multiplication, read, write, and logical comparisons (e.g., is equal to, is greater than, is less than), computers are unable to evaluate an instruction of, "Does this first shape look similar to this second shape?"

Accordingly, techniques are disclosed for comparing a user-selection section of a graph to other data without needing a provided mathematical equation of the selected shape.

Figure 7:
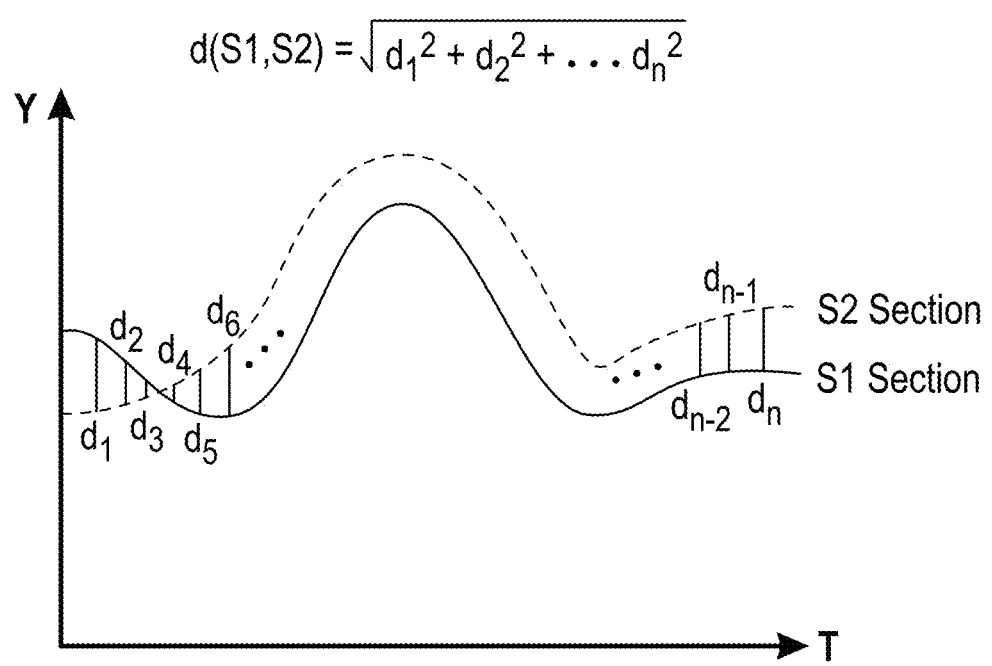
FIG. 7 shows an example of how distance can be calculated between two candidate sections.

A first technique for a computer to compare a user-selected section of a graph to other data without a provided algebraic expression of the user-selected section of a graph is to perform a distance calculation. For example, a Euclidian distance between two, 2-dimensional (x, y) points can be expressed as $\sqrt{\Delta x^2 + \Delta y^2}$. The Euclidian distance between time series S1(y1, y2, y3, etc.) and time series S2(z1, z2, z3, etc.) can be expressed as $\sqrt{(y1-z1)^2+(y2-z2)^2+(y3-z3)^2}$...(e.g., as shown in FIG. 7). Other distances, such as Mahalanobis distances, Minkowski distances, Jaccard similarity, Cosine similarity, etc. can be used. In some embodiments, other statistical metrics such as difference, deviation, variation, etc. can be used. These distances can be calculated to compare a selected data section against all of the time series data stored in the first database 123, and the comparison can be made at all phases (e.g., starting at time=0, then starting at time=0.1, then starting at time=0.2, etc.).

However, when the amount of data becomes large, such a computationally intensive analysis becomes impractically slow. A typical 3-GHz processor, with an unrealistic 100% pipeline and prediction efficiency, can perform about 3 billion pipeline operations per second. Each Euclidean term includes three operations: a subtraction of two values (e.g., y1−y2) to determine a difference, a squaring or multiplication of the difference to yield a product, and an addition of the product to the next term. In an example, a user selects a 10 second time series data selection sampled at 1,000 Hz for 10,000 total data points, and a Euclidian distance comparison is performed against time series data that includes 1,000 samples per second for 24 hours, or about 86.4 million data values. Each 10,000 data point comparison would take about 30,000 operations; this would be performed at each phase offset for 86,390,000 times. The processor could complete the query in about 864 seconds or 14.4 minutes (unrealistically ignoring any additional read/write latency). To search data collected over one year, this would take 365 times as long, or about 87.6 hours. If 10 sensors were included, then the computation would take about 5.2 weeks to complete. For the same or similar reasons, when the quantity of data is sufficiently large, a processor may not be able to perform a real-time analysis on a stream of data, such as sensor data, without the improved techniques described herein.

How to Process the Search More Responsively

A second technique can be used to perform computations in a way that responds more quickly when users want to perform a search for similarly looking sections of a graph. The second technique can also provide more accurate search results in terms of graphical similarity by being less sensitive to shifts in time or value. A classifier technique can be used, and a search index for the classifier can be pre-computed. Although the examples below are discussed with respect to the kth nearest neighbor ("kNN") technique, the teachings disclosed herein can extend to any similar classifier technique.

The kNN technique can be used to find similar points. Distances between nearby (or all) points can be determined, and a search index (such as a table, tree, or other data structure) to facilitate kNN comparisons can be pre-computed before a user performs a search. In response to a user request for a search, the index can be referenced to determine nearest neighbors (which can indicate similar-looking sections of graphs) substantially more responsively than brute force distance computation. The kNN technique has been used to provide approximate solutions to finding nearest neighbors, but the answers are not always necessarily correct. Realizations included herein are that the kNN technique or other techniques can be used to find similar vectors that correspond to similarly looking sections of graphs, and that techniques can be used to overcome the accuracy problem.

Figure 4:
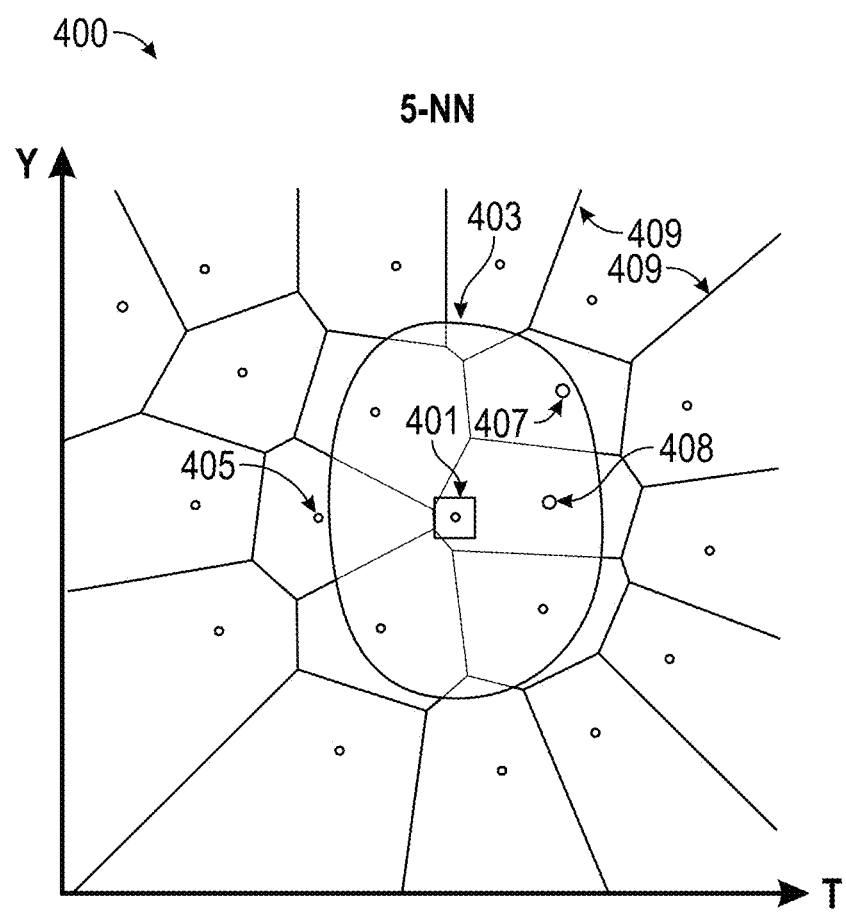
FIG. 4 shows an example representation of nearest neighbor search results in a 2-dimensional plot.

FIG. 4 shows an example representation of NN search results in a 2-dimensional (X, Y) plot 400. The plot 400 includes a number of data points (including 405, 407, and 408) a user selected data point 401, lines 409 indicating indexed boundaries, and a line 403 indicating a 5NN (five nearest neighbors) search result.

A first kNN search is performed to find the k=1 nearest neighbor of the selected data point 401. A plurality of lines 409 indicate divisions of the X-Y space indicating which point is nearest. The division boundaries 409 can be pre-computed and stored as a search index, such as a table, tree, or other data structure. The user-selected data point 401 is located in the division including point 408, and therefore is closest to point 408. Accordingly, in response to a user query seeking the nearest neighbor of user selected point 401, the search index can be referenced to determine the nearest neighbor instead of computing the distance between point 401 and all other points.

The pre-computed index for assisting searches and comparisons can be extended to find the k=5 nearest neighbors or other numbers of nearest neighbors. In some implementations, accuracy can suffer when the "k" value increases, the dimensions increase, or if some dimensions are weighted differently than others. A line 403 includes an example index result, where 5 nearby neighbors of user selected point 405 are determined. However, the results may sometimes incorrectly exclude point 405 and include point 407.

As disclosed further below, the comparisons, such as a kNN search, can be used to find graph sections that look similar in a computationally efficient manner. It is realized that the 2-dimensional, XY coordinate example shown in FIG. 4 can be extended to higher-dimensional vector space, the kNN technique can be applied to vectors of 3 or more terms, and that the data stored in the first database 123 can be treated as a vector. At high dimensions, data comparisons can be performed to determine boundaries (similar to the lines 409) in higher dimensions. Based at least in part on the comparisons, number of indexes, such as a 5NN (five nearest neighbors) index, a 10NN (ten nearest neighbors) index, a 30NN (thirty nearest neighbors) index, indexes ranking the order of similar sections, etc. can be pre-computed for the data stored in the first database 123 and stored in the second database 125 before a user search. In response to a user search, the index in the second database 125 can be referenced to find the nearest neighbors (which indicate the most similar looking sections) of a user-selected section. However, directly treating each time series data (or any data) as a vector is still computationally intensive. For example, converting a section of time series data from sensor S1(y1, y2, y3, . . . , $y_n$) into a vector V[y1, y2, y3, . . . , $y_n$] yields limited computational benefit for making comparisons.

Smaller Vector Form

Techniques can be used to reduce the complexity of the vectors. A smaller vector form can reduce the storage space for the vectors in a computer system, and the vectors can be processed faster. Sections of the time series data can be mathematically transformed (such as by using a Fourier transform, a Fast Fourier transform, a Chebyshev transform, etc.), and a smaller vector representation of the sections of the time series data can be created. The vector representation can also include a normalization index (e.g., a $y_{min}$ and a $y_{max}$). For example, time series data (y1, y2, y3, . . . , $y_n$) can have a vector representation including one or both normalization indexes $y_{min}$, $y_{max}$ and the coefficients (e.g., $C_0$, $C_1$, $C_2$, . . . , $C_m$) associated with the resulting transformation, and "m" can be a number smaller than "n" such that the number of terms in the vector representation is less than the number of terms in the time series data.

As an example, a user-selected section of data can include (1, 1, 3, 5, 2, 3, 3, 2, 5, 1, 2, 3, 5, 1, 3). It can be identified that the minimum value is 1 and a maximum value is 5. Accordingly, $y_{min}=1$ and a $y_{max}=5$ term can be included as numbers in the vector to indicate the range. This can preserve data about the range of data and magnitude of changes. Then, the data can be normalized (e.g., scaled and/or shifted) to a normalized range (e.g., from 0 to 1, from −1 to −1, or any other range) so that later on, coefficients of shapes in a normalized range can be more accurately compared to each other. In some embodiments, a normalizing range of the data can be equivalently captured by $y_{range}=4$, and a shift from the normalized minimum can be reflected with $y_{shift}$ (which can be 1 to indicate that the minimum value is shifted by 1 as compared to an example normalization range beginning at 0). Any of the example normalization values can be included in a vector representation of a section.

A user-selected section (y1, y2, y3, . . . , $y_n$) of time series data can also be mathematically transformed. For example, a Chebyshev polynomial can be fitted to a user-selected section (y1, y2, y3, . . . , $y_n$) of time series data, and the coefficients of the expansion terms in the resulting transform (see Eq. 1) can be included in a vector representation (see Eq. 2).

$$(y1, y2, y3, \ldots, y_n) \approx C_0 T_1(x) + C_1 T_2(x) + C_2 T_3(x) + \ldots + C_m t_m(x) \quad \text{Eq. 1}$$

$$\text{Vector} = [C_0, C_1, C_2, \ldots, C_m] \quad \text{Eq. 2}$$

The $T_\#$ terms are the basis polynomials. Accordingly, any section of time series data can be represented with a vector including normalization values and/or the coefficients from a transform. An example vector can include $[y_{min}, y_{max}, C_0, C_1, C_2, \ldots, C_m]$. A vector of "m" terms can represent (approximately) a data series having significantly more than "m" terms, especially if the frequency of the data series is less than m/2. Although a Chebyshev transform is used as an example, it should be understood that the coefficients of other mathematical transforms, such as a Fourier transform (cosine, sine, fast, or other), Taylor series expansion, McLauren expansion, Laplace transform, geometric series, arithmetic series, polynomial series, or any other similar approximation, expansion, or transform can be used. More generally, any (X, Y) data series can be approximated as in Eq. 3 below and represented by the vector in Eq. 2.

$$(y1, y2, y3, \ldots, y_n) = C_0 + C_1 f_1(x) + C_2 f_2(x) + \ldots + C_m f_m(x) \quad \text{Eq. 3}$$

Instead of comparing the full time series data, smaller vectors that represents the time series data can be used to make comparisons or generate indexes. For example, to directly compare two vectors, the Euclidian distance formula can be applied to the vector terns. By using the smaller vectors, smaller quantities of data can be computed much faster as compared to comparing the actual data. The vectors and search indexes for facilitating searching and comparisons of vectors can be pre-computed and stored in the second database 125 shown in FIG. 1.

When a user selects a section of a graph such as shown in FIG. 2, the user-selected section can be converted into a vector representation. Then, using one or more search indexes, the nearest neighbors of the vector representation of the user-selected section can be determined in a computationally efficient manner.

When the actual computations for similarity are performed, certain terms of the vector can sometimes be given more or less weight. For example, if a user indicates that a shape of a graph is more important than the actual values, then the normalization indexes and $C_0$ term (which can indicate an average in some series) can be ignored or given less weight.

Variable Time Sections

Two vectors can be compared against each other for similarity when they represent the same amount of data or same x-axis domains. In the case of time series data, two vectors can be compared when they represent the same amounts of time. The stored time series data (e.g., the S1 time series data) in the first database 123 of time series data can be processed to determine corresponding vectors and search indexes (e.g., S1 Vectors and Index) that can be stored in a second database 125 as shown in FIG. 1.

The vectors and search index can be pre-computed and stored in the second database 125 before a user indicates a selected section of a graph for comparison. When the user selects a section 201 of a graph (as shown in FIG. 2), the user-selected section can be converted into a vector representation based on the same scheme using the same mathematical transformation, including the same normalization indexes, and including a same number of coefficients. In response to a user request to find similarly looking graph sections, the pre-computed information in the second database 125 can be used to facilitate determining the nearest neighbor vectors without performing brute-force distance comparisons against all data.

The vector data and search index can be pre-processed and made available before a user search is performed. The vectors can then be compared against user selections representing equal lengths of time. However, the user can select any arbitrary length of time (or amount of data). Therefore, it is unknown what variable-length vectors and indexes to pre-compute until the user wants to perform a comparison and interacts with the computer 111 of FIG. 1, but by then, it may be too late to realize the advantages of pre-computation.

Additional techniques can be used to achieve the improved response speeds associated with pre-computed vector data of smaller sizes and indexes despite not knowing what the user will select ahead of time, such as a particular section of a graph, an amount of time, or quantity of data. The techniques disclosed herein can also apply to unknown quantities or domains of other types of data selected by a user.

Pre-computing all possible vectors representing all possible sizes of selectable data at every phase-shifted offset can take more storage room than the actual sensor data and/or can take an unreasonably long amount of time. A technique discussed with respect to FIG. 5 can be used to pre-compute vector representations of various amounts of data (e.g., various times) before receiving the user selection of data shown in FIG. 1. The technique also uses substantially less storage space and processing power than pre-computing all possible vectors of all possible offsets.

Figure 5:
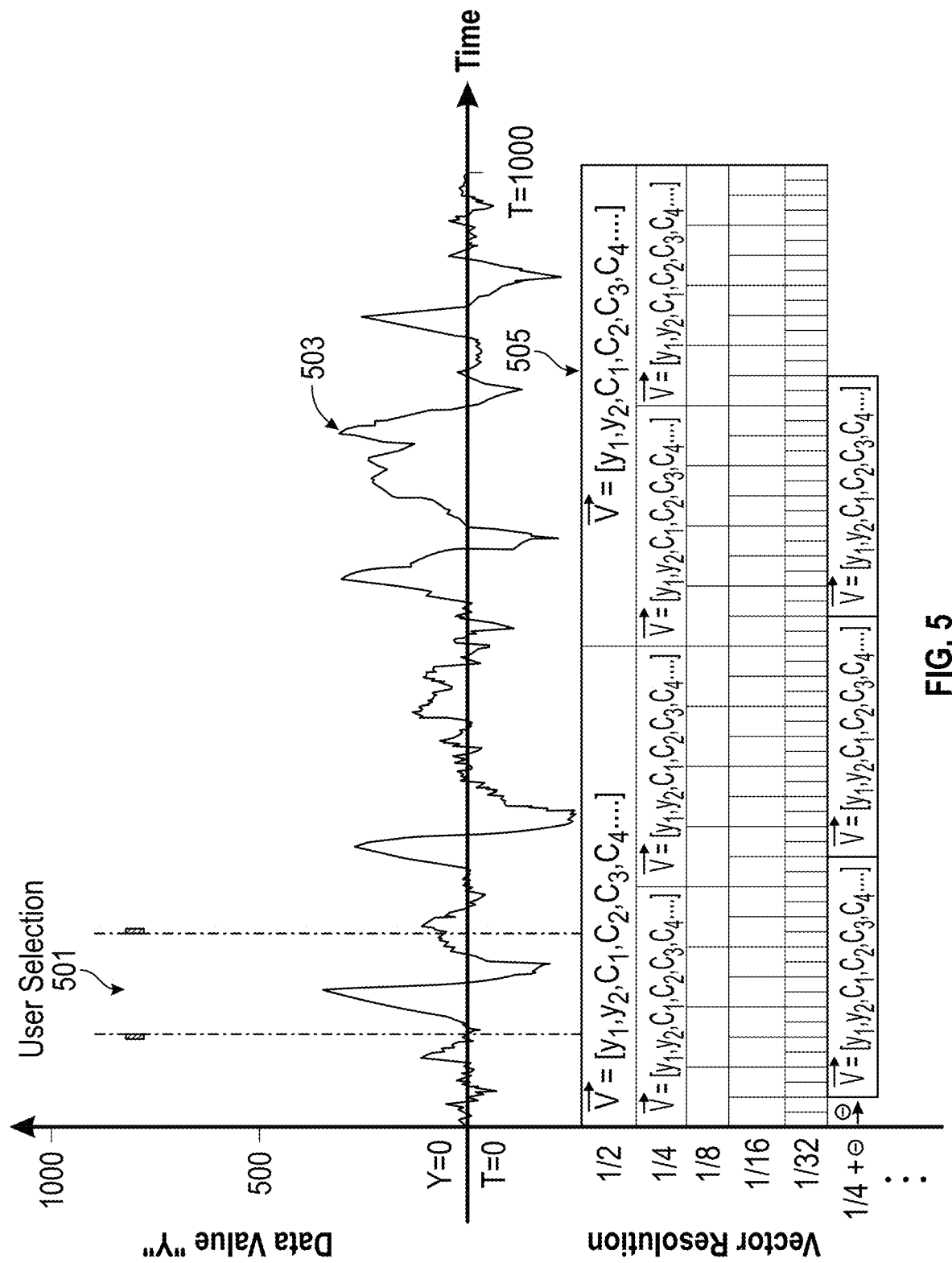
FIG. 5 shows a representation of time series data and corresponding vector data.
Figure 6:
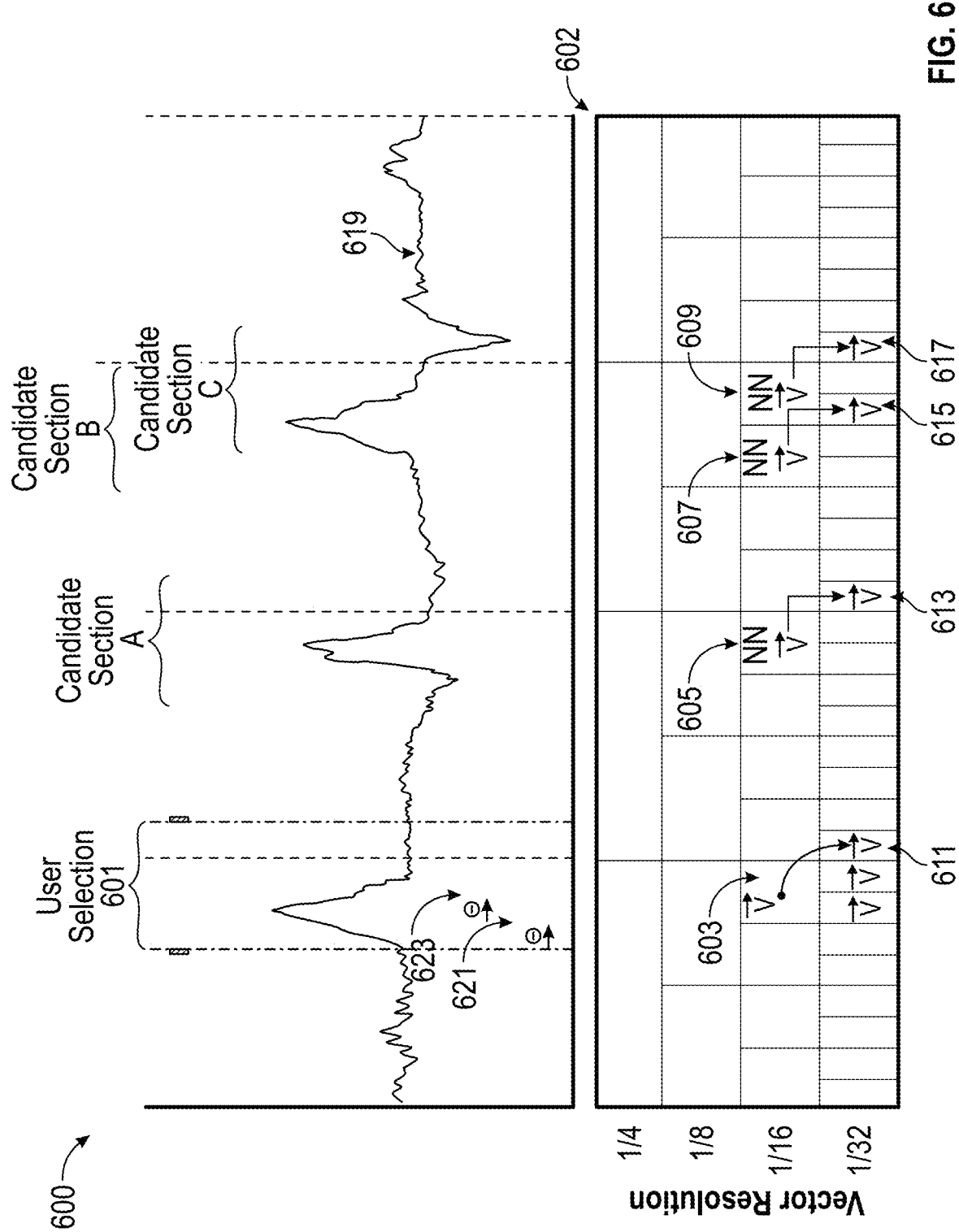
FIG. 6 shows an example of using vector data to compare the time series data.

After receiving a user selection of data, the vectors shown in FIG. 5 can be used as discussed with respect to FIG. 6 to find sections that look similar to a user-selected section. As further discussed with respect to FIG. 6, once a pre-processed vector representing a first length (such as a larger length of time) has been compared to a vector generated based on the user-selected section, additional pre-processed vectors representing additional lengths (such as smaller or phase-shifted of lengths of time) can be compared to other vectors representing additional parts of the user-selected section (such as correspondingly smaller lengths of time). The additional comparisons can be used to find additional candidates and/or refine the candidate selection.

FIG. 5 shows example representations of time series data 503 and corresponding vector data 505. A user selects a section of the graph 501 for comparison.

The vector data 505 includes vectors that represent different contiguous amounts of the time series data 503. Each vector in the vector data 505 is drawn as a block that is aligned with a section of the time series data 503 represented by the vector. The example vector data 505 is organized into resolution levels, with vectors representing the longest amounts of time series data 503 labeled with "½" resolution, and vectors representing increasingly shorter amounts of time series data 503 in the finer resolution levels.

The vector data 505 can include a vector (not shown) representing the entire span of time series data 503. The vector data 505 can also include vectors representing first-sized subsets of the time series data 503. In the example, two vectors at the "½" resolution level represent respective halves of the time series data 503. The vector data also includes vectors representing smaller subsets of the time series data 503, including quarters of the time series data 503 indicated by ¼, eights of the time series data indicated by ⅛, and so on.

Although the example shown in FIG. 5 shows a plurality of resolution levels where vectors in an incrementally finer resolution level represents half the amount of time series data in the incrementally coarser resolution level, other types of resolution schemes can be used, including divisions of fixed amounts, divisions by other numbers, divisions by different numbers at different resolution levels, different divisions for different sections of the time series data, etc. The vector data 505 can be organized to include a plurality of different resolution levels including vectors representing different sized subsets of the data.

Pre-processing sections of time series data to create vectors can cause phase information to be lost, which can cause accuracy to be lost. To preserve accuracy, different, phase-shifted versions of the pre-processed vectors can be created, and the comparisons repeated against phase-shifted versions of the vectors.

In addition to the vectors shown in FIG. 5, phase-shifted versions of the vectors can also be determined. An example of ¼ vectors phase-shifted by 0 are shown, where the width of each illustrated vector is aligned with the section of the graph that the phase-shifted vector represents. A phase-shifted vector can represent a subset of the time series data 503 at the same resolution levels as a non-phase-shifted vector, but beginning at a different time. The phase-shifted vectors can be determined, for example, at a plurality of phase shifts by an amount "0."

For example, vector data 505 can include the V/2 vectors phase-shifted by T=50, T=100, T=150, T=200, T=250, T=300, T=350, T=400, and T=450. As another example, the vector data 505 can include T=2, T=4, T=6, T=8, T=10, T=12, and T=14 phase-shifted versions of the V/64 vectors. In other examples, the phase shifts within resolution levels can be different values, vectors within a resolution level can be phase-shifted by different increments, and/or the phase shifts at a first resolution level can be larger, smaller, or the same as vectors in other resolution levels.

The vector data 505, including the vector representations of different contiguous amounts of the time series data 503 at different resolution levels, and including the phase-shifted versions thereof, can be stored in the second database 125 shown in FIG. 1. A search index for facilitating comparisons and determinations of similar vectors can be included for the vector data 505 as well.

FIG. 6 shows an example 600 of how vectors can be used to find similarly looking sections of a graph. Time series data is plotted as a graph 619. A user can select a section 601 of the graph to find similarly looking sections. A plurality of vectors 602 representing different contiguous amounts (quarters [¼], eighths [⅛], sixteenths [1/16], and thirty-seconds [1/32]) of the time series data 619 can be pre-computed, indexed, and stored in a database (e.g., the second database 125 shown in FIG. 1) before the user selects the section 601. Vectors 603, 605, 607, and 609 are vectors representing different one-sixteenth sections of the graph 619. Vectors 611, 613, 615, and 617 are vectors representing different one-thirty seconds (1/32) of the graph 619. Phase-shifted versions of the vectors 602 are not shown. However, the techniques disclosed herein can be repeated and applied to phase-shifted versions of the vectors 602.

A user can select section 601, which includes a peak shape followed by an average section. The user wants to quickly search for other similarly looking sections within the same graph. In other examples, the user can also search for more complex shapes in other graphs. The amount of time series data included in the user-selected section 601 may not exactly align with any division of the time series data represented by any of the vectors 602.

In such a case, a first comparison can be performed based at least in part on a first vector 603 at a first resolution level (e.g., at the 1/16 resolution) to determine similar vectors. In the example shown in FIG. 6, a first vector 603 that represents a largest section of time series data included in the user-selected section 601 is selected as a starting point for comparison. In other words, the first vector 603 may be the largest vector that can fit within user-selected section 601.

The nearest (or similar, or mathematically close) neighbors of the first vector 603 can be determined. The nearest neighbors can be determined by comparing the first vector 603 to other vectors of the same resolution, such as by performing a distance comparison. The nearest neighbors can also be determined by referencing an index to perform an index-assisted comparison. As used herein, a comparison can refer to either a direct comparison or an index-assisted comparison if the context allows for both. By referencing an index (e.g., a pre-computed index stored in the second database 125), the nearest neighbors of first vector 603 can be determined to include vectors 605, 607, and 609 in a computationally efficient manner. The index can, for example, already list that the nearest neighbors of vector 603 include vectors 605, 607, and 609. Accordingly, the index-assisted comparison of vector 603 can include looking up the comparison results in the index.

Based at least in part on identifying vectors 605, 607, and 609, initial candidate sections A, B, and C can be determined as sections of the graph 619 that will likely look visually similar to a user-selected section 601. The initial candidate sections A, B, and C include sections of the graph that are represented by vectors 605, 607, and 609 and extend to cover the same amount of time as the user-selected section 601. Each candidate section can span from a starting point to an ending point of a section of the graph 619.

Indeed, initial candidate sections A, B, and C represent sections of the graph that include above-average data points and at least a portion of a peak. In some embodiments, an initial similarity ranking can be performed, such as that the initial candidate sections B, A, and C are in order from most to least similar to the section of graph represented by vector 603. The order can be based on indexed information about which vectors are most similar to the first vector 603, based on computed distances between the first vector 603 and vectors 605, 607, and 609, or based on computed distances between the user-selected section 601 and the candidate sections A, B, and C.

A second comparison can be performed based at least in part on a vector 611 of a second resolution level (e.g., at the $\frac{1}{32}$ resolution). The second vector 611 for comparison can be a vector representing a second section of the graph that is included in the user-selected section 601. The second vector 611 may be the next largest vector that can fit within user-selected section 601 and/or that is adjacent to the first vector 604. As shown, vector 611 represents a section of the graph after the vector 603, so vector 611 can be compared to vectors 613, 615, and 617 that represent sections of the graph after vectors 605, 607, and 609, respectively. The comparisons can be direct comparisons or facilitated by the index.

The second comparison can be used to confirm or re-rank the initial candidate sections. For example, the graph section represented by vector 617 (a decreasing section of the graph 619) may not look sufficiently close or be mathematically close to the section of the graph represented by vector 611 (a relatively flat, average section of the graph 619). Accordingly, an accurate index (e.g., the index in database 125 of FIG. 1 and described with respect to FIG. 4) may indicate that vector 617 and vector 611 are not similar. Similarly, a direct comparison of the coefficients included in vector 617 and 611 may indicate that the vectors are not similar. Based at least in part on the comparison of vector 617 to vector 611, candidate sections C can be removed from the list of candidate sections. In some embodiments, the ranking of candidate sections can be reordered. For example, based at least in part on comparisons of vectors 613 and 615 to vector 611, it can be determined that the candidate section A is more similar to the user-selected section than candidate section B.

The comparisons can be performed additional times, such as for vectors representing even more granular resolution levels of time, for vectors representing sections of the graph 619 preceding the section represented by vector 603, and/or for vectors representing sections of the graph 619 after the section represented by vector 613.

After a number of comparisons of vectors (which can include comparisons of the starting point vector 603, comparisons of smaller or neighboring vector 611, further comparisons of smaller or neighboring sections, and/or comparisons of phase-shifted versions of the vectors), a list of final candidate vectors can be determined. The final candidate sections can look visually similar to the user-selected section 601. The final candidate vectors can represent sections of the graph that can be more visually similar to the user-selected section 601 than other sections of the graph represented by vectors that are not included in the final candidate vectors.

Although the example second comparison is shown to be one resolution level below the first comparison, the second comparison can be at a different resolution level (e.g., two or more resolution levels below the first comparison). The second comparison can also be performed for a vector representing a section of the graph 619 preceding the section represented by vector 603. Although both of the vectors 603 and 611 represent sections wholly included in the user-selected section 601, in some embodiments, the vectors can represent sections partially included in the user-selected section 601.

The comparison of vector 611 to vectors 613, 615, and 617 can be performed with reference to an index (e.g., the index in database 125 of FIG. 1 and described with respect to FIG. 4). However, in some embodiments, the comparison of vector 611 to vectors 613, 615, and 617 can be performed with a more computationally intensive process (e.g., directly using a distance computation). It should be noted that by determining a limited number of candidates, the number of comparisons performed by a processor in response to a user search request is significantly reduced. For example, if an index identifies that vectors 613, 615, and 617 are similar to vector 611, then a distance comparison of vector 611 to vectors 613, 615, and 617 can be performed without performing distance comparisons of vector 611 to all of the $\frac{1}{32}$ vectors.

Although FIG. 6 shows three nearest neighbors are selected as initial candidates, it should be understood that in some embodiments, more or fewer initial candidates can be selected. In some embodiments, any number of initial candidates meeting minimum similarity criteria can be selected.

In some embodiments, a larger number of initial candidates can be selected based on the vector at the first resolution level, and the number of initial candidates can be subsequently refined to determine smaller numbers of candidates based on increasingly strict similarity criteria. For example, an initial search can be performed for vectors similar to the starting point first vector 603. The first vector 603 can include a $[y_{min}, y_{max}, C_0, C_1, C_2, \ldots, C_m]$. The first comparison may find other vectors having an similar range of $y_{min}$ to $y_{max}$ (e.g,. determine which other vectors have a $y_{min}$ to $y_{max}$ range within a threshold distance from the first vector's 603 $y_{min}$ to $y_{max}$) or find other vectors having an similar $C_0$ term (e.g., determine which other vectors have a $C_0$ term within a threshold distance from the first vector's 603 $C_0$ term), which is indicative of an average value. The other coefficient terms may play a lesser role or no role. When vector 611 is compared to vectors 613, 615, and 617 to narrow down the initial candidate sections, the other coefficients (e.g., $C_1, C_2, \ldots, C_m$) can be used or weighted more heavily in comparisons.

FIG. 6 shows the vector 603 as one starting point for comparison, but in some embodiments, two or more vectors in a resolution level can be used as starting points for comparison. In some embodiments, starting points for comparison can be selected from among vectors representing phase-shifted divisions of the graph.

The comparisons can be performed any number of times based on additional vectors (e.g., the vectors at different resolution levels or vectors that represent different sections of time) to confirm, refine, and/or re-rank the candidate sections.

The comparisons can also be repeated for phase-shifted vectors selected at different offsets 621, 623 as another way of preserving phase information. The offsets can be at different offset amounts from a beginning or end of the user selected section 601. The offsets can be any amount and may not exactly align with any division of the time series data represented by any of the vectors 602. At each offset, a largest vector to the left and/or right of the offset that is still included in or fits in the user selected section 601 can be selected as a vector for comparison.

For example, a size ⅛ vector could fit within the user selected section 601. To perform a comparison against other vectors of size ⅛, a vector (not shown) can be computed, where the computed vector represents a portion of the selected selection 601 beginning at no phase offset from the beginning of the selected section 601 and extending for ⅛ of the time series data. The computed vector can then be compared to other ⅛ vectors as described above.

At phase offset 621, a size 1/16 vector is a largest vector that could extend from phase offset 621 and still fit within the user selected section 601. To perform a comparison against vectors of size 1/16, another vector (not shown) can be computed, where the computed vector represents a portion of the selected section 601 beginning at phase offset 621 and extending for 1/16 of the time series data. The computed vector can then be compared to other vectors representing 1/16 sections of the data as described above.

At phase offset 623, a size 1/16 vector is still the largest vector that could extend from phase offset 623 and still fit within the user selected section 601. To perform a comparison against vectors of size 1/16, another vector (not shown) can be computed, where the computed vector represents a portion of the selected section 601 beginning at phase offset 623 and extending for 1/16 of the time series data. The computed vector can then be compared to other vectors representing 1/16 sections of the data as described above. Accordingly, vectors representing different sizes of the user selected section 601 can be computed at a plurality of phase offsets, wherein each computed vector is a largest size that extends from the phase offset and still fits within the user selected section 601, and the computed vectors can be used for comparison against respectively sized vectors 602.

Computation of Final Distances

As discussed above, a number of final candidate sections can be determined. Each candidate section can include a section of the graph 619 represented by at least one vector. For example, a first candidate section can be a section of the graph represented by at least vector 607 and vector 615, and a second candidate section can be a section of the graph represented by at least vector 605 and vector 613. The final candidate sections can additionally or alternatively include candidates represented by phase-shifted vectors. Final candidate sections of the graph 619 represented by phase-shifted vectors may overlap, at least partially, with other candidate sections.

The number of final candidate sections can be relatively small compared to the total number of possible options. In some embodiments, the number of final candidate sections can be tens, hundreds, or thousands instead of millions, billions, trillions or more. In some embodiments, the number of final candidate sections can be at least one, two, three, four, or five orders of magnitude fewer than the total number of possible options.

In view of the relatively smaller number of final candidate sections, the data included in the final candidate sections can be read from a database (e.g., the first database 123 shown in FIG. 1) and direct distance calculations can be performed to rank the final candidate sections. Although direct distance calculations can be more computationally intensive, a processor can still timely and responsively (e.g., within a few seconds, or at least as fast as incoming data is streamed) perform the computations when the number of final candidate sections is sufficiently small.

FIG. 7 shows an example 700 of how distance can be calculated between two data series. In the example, a user selected a section of the graph S1, which is being compared to a candidate section of graph S2 indicated by the dotted lines. S2 can be a final candidate section, originally from a same or different graph as S1, and is superimposed on top of the same domain as S1, such as a time domain.

There can be difference measurements ($d_1$, $d_2$, ... $d_n$) taken between S1 and S2 at various intervals. The smaller the interval, the more accurate the distance calculation can be. The larger the interval, the faster the computation can be. The Euclidian distance formula, shown in FIG. 7, can be used to calculate the distance between the candidate section S2 and the user-selected section S1.

A direct distance calculation, such as the Euclidian distance, Mahalanobis distances, Minkowski distances, Jaccard similarity, Cosine similarity, etc. can be performed on all of the final candidate sections. In various embodiments, any statistical metric can be used. The final candidates can be ranked based at least in part on the distance calculation, and the smallest distances can indicate the closest looking graph sections.

The final candidates can also be confirmed. For example, if a distance calculation for one of the final candidates does not satisfy a threshold distance, then that final candidate can be removed.

Any final candidates representing overlapping sections of a graph can also be de-duplicated. For example, a first section of a graph and a second section of a graph may be included as final candidates, where the second section partially overlaps with the first section. This can occur, for example, if a first vector and a phase-shifted version of the first vector both represent graph sections that are similar to a user-selected section of a graph. Whichever among the first section and the second section that has a closer distance calculation can be kept among the final candidates, and the other can be "de-duplicated" or removed from the list of final candidates.

The final candidate sections can then be listed, displayed, or otherwise indicated in a user interface, for example as shown in FIG. 3. The final candidate sections can be ranked in order of how closely they match the user-selected section.

Faster Responses with Vector Reconstruction

As mentioned above, in some embodiments, the sections of data included in the final candidate sections can be read from a database (e.g., the first database 123 shown in FIG. 1) and direct distance calculations can be performed to rank the final candidate sections. Performing the comparisons uses the candidate section data.

For people, reading or looking up the answers to a math computation is normally the fastest way to determine the answer to the math computation (instead of a person performing the math computation to determine the result). However, with a computer, a counter-intuitive result can occur: it can be faster to perform a computation to determine the candidate section data by performing an inverse mathematical transform of the vector data than to read the original series data for the candidate sections from a database. There can be a latency cost for reading the sections of data included in the final candidate sections from a database (e.g., the first database 123 shown in FIG. 1). Some special purpose computers, such as digital signal processors (DSP), can perform inverse fast Fourier transforms on cached data much more quickly than data can be read from a hard drive.

As a faster alternative to reading the information from the first database, vector data can be read from memory (such as reading the S2 Vectors as memory 119 shown in FIG. 1) with less latency, and the data represented by the vectors can be reconstructed from the vector data, such as by performing the reverse of the mathematical transform used to generate the vector data. For expansions, reversing the mathematical transform can be performed by evaluating the expanded terms (e.g., by evaluating the terms in Eq. 1 using the coefficients in Eq. 2 and any normalization indexes).

For example, with respect to FIG. 7 and FIG. 1, instead of reading the data for a section of S2 from the first database 123, the cached vector data from S2 can be read from memory 119 (or read from the first database 125). The processor 117 can then reconstruct the section of S2 represented by one or more vectors, and then perform the distance computation shown in FIG. 7. Reading the cached S2 vector data from memory and reconstructing the section of S2 represented by the vector data can be faster than reading the actual vector data from the first database 123. In some cases, high-frequency components of the data can be lost if a vector includes insufficient high frequency components or has too few coefficients, and accuracy can be sacrificed.

Accuracy

As mentioned above, some of the techniques disclosed herein, including techniques for creating search indexes and vector-reconstructed approximations of original data, may not be completely accurate. However, in view of the repeated number of comparisons performed (e.g., direct distance comparisons, index-assisted comparisons, for a vector at a resolution level, for a vector at a different resolution level, repeated comparisons and computations for phase-shifted version of vectors), any errors will likely be caught at one of the many stages, or at least sufficiently uncommon such that visually satisfactory results can be provided to users.

Example Flowchart

Figure 8:
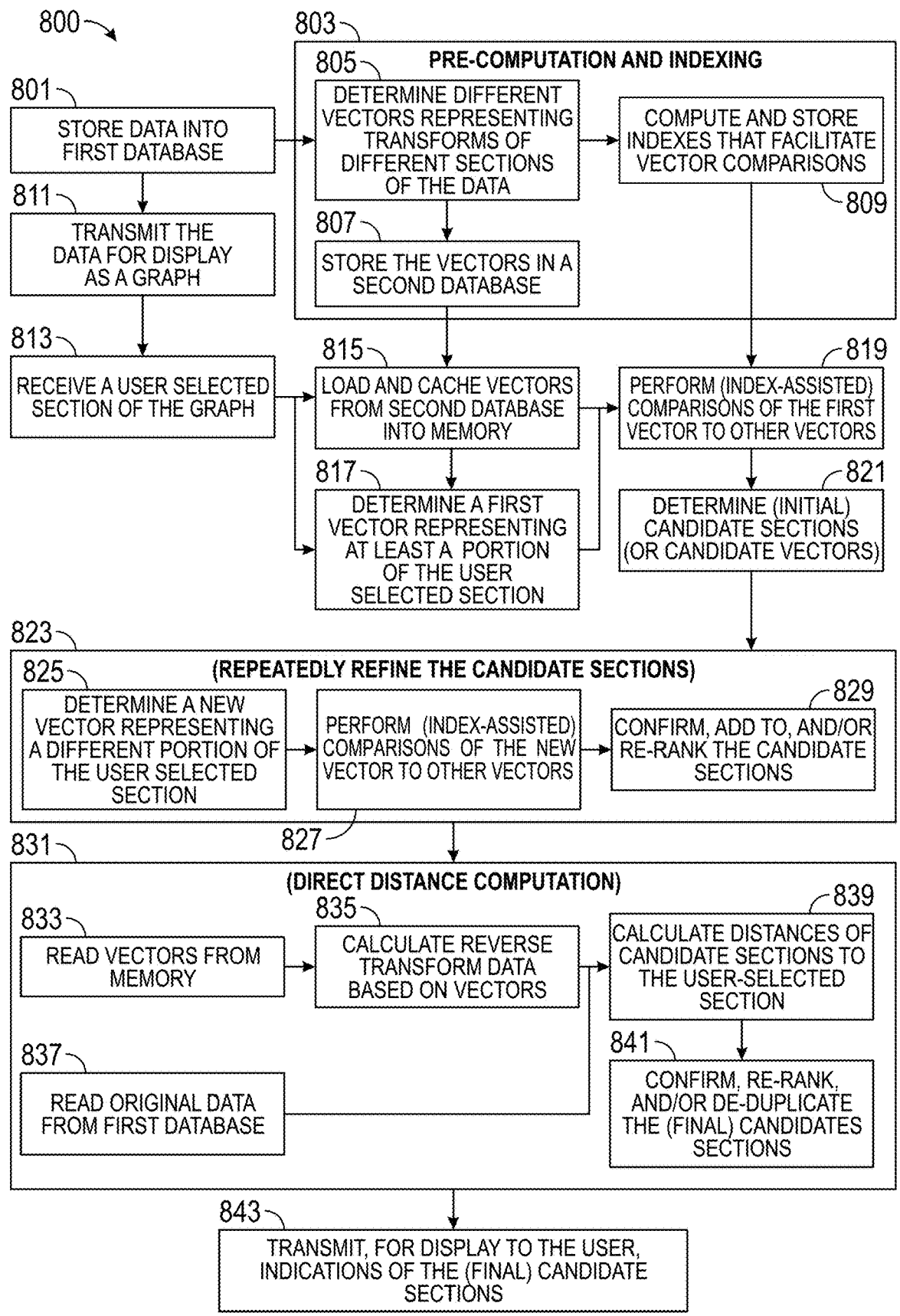
FIG. 8 shows an example flowchart for using a computer to search for graph sections that are visually similar to a user-selected section of a graph.

FIG. 8 shows an example flowchart 800 for using a computer system to search for graph sections that are visually similar to a user-selected section of a graph.

At block 801, data is stored into a first database. An example first database 123 is shown in FIG. 1. The data can be any data. In some embodiments, the data can be time series data. The data can be received from one or more sensors.

At block 803, pre-computation and indexing can be performed. In some embodiments, the pre-computation and indexing can be performed before receiving a user request to perform a search. In some embodiments, the pre-computation and indexing can be performed on the data stored in the first database before new streaming data is received.

At block 805, different vectors representing transforms of different sections of the data can be determined. The vectors can include a normalization index. The vectors can include terms (such as coefficients) generated based at least in part on a mathematical transform. In some embodiments, each vector can represent a continuous section of the data. The vectors can represent the data at different resolutions. The vectors can also represent the data starting at different phase shifts.

At block 807, the vectors can be stored in a database, such as the second database 125 shown in FIG. 1.

At block 809, indexes that facilitate vector comparisons can be computed and stored. The indexes can be any format, such as a table, tree, or other data structure. An index can, for example, be used to facilitate a search or similarity comparison. The indexes can improve the processing speed of computations performed in blocks 819 and 827.

At block 811, the data can be transmitted for display as a graph. In some embodiments, the data can be read from the first database 127 and transmitted to a user system 107 as shown in FIG. 1. In some embodiments, data can be transmitted from a sensor 103 to a user system 107 as shown in FIG. 1. The user system can display the data as a graph.

At block 813, a user can select a section of a graph. For example, the user system 107 of FIG. 1 can receive the user-selected section and perform a search. As another example, the user system 107 can transmit the user-selected section to a data center 109, and the data center 109 can receive the user-selected section and perform the search.

At block 815, vectors from the second database (e.g., the second database 125 of FIG. 1) can be loaded and cached into a memory (e.g., memory 119 of FIG. 1). This can reduce latency when the vector data is later read and processed at blocks 833 and 835 instead of reading data from a database at block 837.

At block 817, a first vector representing at least a portion of the user-selected section can be determined and used as a first vector for comparison. For example, as shown in FIG. 6, a user-selected section 601 is received, and first vector 603 is determined to represent a portion of the user-selected section 601. In some embodiments, a vector representing a largest portion (e.g., at the least granular resolution) that is included within the user-selected section 603 is determined and used as the first vector for comparison. In some embodiments, the first vector can be a phase-shifted resolution section.

At block 819, a comparison of the first vector to other vectors can be performed. In some embodiments, the comparison can be a direct distance comparison of two vectors, such as determining the Euclidian distance or other statistical metric between two vectors. In some embodiments, the comparison can be inherently performed by referencing an index that indicates results or rankings of comparisons.

At block 821, as a result of the comparison, candidate sections can be found. For example, if a 3NN search technique is used in the example shown in FIG. 6, candidate vectors 605, 607, and 609 can be found as the 3 nearest neighbors. Each of the candidate vectors 605, 607, and 609 represent a section of the graph 619 that can be included in a section of the graph that will be returned to the user as a search result in block 843. The candidate sections can match an amount of data (e.g., the same span of time in time-series data, the same number of data points) included in the user-selected section of data. The candidate sections can include a section of the graph represented by the candidate vectors, and can also include additional sections, such as graph sections to the left or right of a section of the graph represented by a candidate vector, or additional sections represented by finer resolution vectors. Candidate vectors can correspond to candidate sections, and where applicable, any technique discussed with respect to either one can be additionally or alternatively applied to the other.

In some embodiments, the candidate vectors and candidate sections determined at block 821 are final candidate sections or final candidate vectors, and block 821 can proceed to block 843. In some embodiments, the candidate vectors and candidate sections are initial candidates that can be further processed and refined in blocks 823 and/or 831.

In block 823, the candidate sections can be refined, and the process can be repeated. In some embodiments, block 823 can be repeated for different vectors (e.g., phase-shifted vectors, finer resolution vectors, and neighboring vectors) that represent graph sections at least partially included in a user-selected section, and the resulting candidate sections can be further processed as shown in block 831 or displayed as results in block 843. In some embodiments, blocks 823 and 831 can be performed together, and then blocks 823 and 831 can be repeated together for different vectors.

At block 825, a new vector representing a different portion of the user-selected section can be determined. In some embodiments, the new vector can be a phase-shifted vector. For example, in FIG. 6, the new vector can be a phase-shifted version of the vector 603. In some embodiments, a largest vector that is adjacent to a phase offset from the user selected section and is included in a user selected section can be selected as the new vector. In some embodiments, the new vector can be a vector of a different resolution than previously analyzed. For example, in FIG. 6, after analyzing first vector 603 of 1/16 resolution, the new vector can be a vector in the 1/32 resolution or any resolution finer than previously analyzed resolution. In some embodiments, the new vector can represent a different portion of the user-selected section of a graph, such as to the left or right of a graph section represented by a previously analyzed vector. For example, in FIG. 6, after analyzing the first vector 603 representing a first section of the graph, the new vector can be vector 611, which represents a neighbor section that is still included in or at least partially included in the user-selected section 601.

At block 827, the comparisons of the new vector can be performed against other vectors. For example, as shown in FIG. 6, if the new vector is 611, then the new vector is compared against other vectors 613, 615, and 617 that are also of the same vector resolution and represent respective relative positions (e.g., to the right). If the index was computed in block 809, then the comparison in block 827 can be facilitated and performed faster by referencing the index.

At block 829, the candidate sections can be confirmed, added to, and/or re-ranked.

As an example of confirming candidates, with reference to FIG. 6, three initial candidate sections (a first initial candidate section A including graph sections represented by vectors 605 and 613, a second initial candidate section B including graph sections represented by vectors 607 and 615, and a third initial candidate section C including graph sections represented by vectors 609 and 617) were determined at block 821. The new vector 611 can be compared to other vectors of 1/32 resolution, and it can be determined that vectors 613 and 615 are within a similarity threshold to vector 611 (e.g., within the 10 nearest neighbors), but that vector 617 is not. Accordingly, the first candidate initial section and the second initial candidate section can be confirmed and remain as candidate sections, whereas the third initial candidate section can be removed from further consideration as a possible candidate.

As a example of re-ranking, with reference to FIG. 6, three initial candidate sections (a first initial candidate section A including graph sections represented by vectors 605 and 613, a second initial candidate section B including graph sections represented by vectors 607 and 615, and a third initial candidate section C including graph sections represented by vectors 609 and 617) were determined at block 821 and ranked in order of similarity: the first initial candidate section A, the second initial candidate section B, and the third initial candidate section C. The new vector 611 can be compared to other vectors of 1/32 resolution, and it can be determined that vectors 615 is most similar, followed by vector 613, and followed by vector 617. Accordingly, based at least in part on the comparison, the initial candidate vectors can be re-ranked in the following order: the second initial candidate section B, the first initial candidate section A, and the third initial candidate section C.

In a third example, three initial candidate sections were determined at block 821 based on a comparison of a first vector. At block 827, a new vector (different from the first vector) is compared against other vectors, and a fourth vector is determined to be very similar to the new vector. A fourth candidate section that includes a section represented by the fourth vector is added to a list of candidate sections, which can include the three initial candidate sections and the fourth candidate section.

At block 831, direct distance computations can be performed. Although direct computations may use relatively more processing power, the computations can be performed on a relatively small number of candidate sections. Accordingly, a processor can still responsively perform the computations. In some embodiments, the processor can still perform the computations as fast as streaming data is received. To perform a distance computation, the data can be read from a database (e.g., in block 837) or (approximately) reconstructed from the cached vector data in memory (e.g., in blocks 833 and 835). Reading cached vector data from memory can be faster than reading the original data from the first database.

At block 837, original data can be read from the first database. The original data can be the data included in the candidate sections.

At block 833, cached vectors can be read from memory. The memory can be, for example, random access memory, L1 memory on a processor die, L2 memory on a processor die, etc. The vectors that are read from memory can be the vectors that represent sections of data that are included in the candidate sections.

At block 835, a reverse transform data can be calculated based at least in part on the cached vectors read from memory. For example, if a Chebyshev transform was used to generate a vector, the Chebyshev expression can be evaluated by multiplying the coefficients and with the Chebyshev terms (and scaled and shifted based on the normalization index) to generate the reverse transform data. As another example, if a Fourier transform was used to generate a vector, then an inverse Fourier transform can be used to generate the reverse transform data.

Accordingly, either block 837 or blocks 833 and 835 can be used to obtain the data for the candidate sections.

At block 839, the distances between the candidate sections and the user-selected section can be computed. A Euclidian distance calculation example is shown in FIG. 7. Other distances, such as Mahalanobis distances, Minkowski distances, Jaccard similarity, Cosine similarity, or statistical metric can be used.

At block 841, the final candidate sections can be confirmed, re-ranked, and/or de-duplicated based at least in part on the calculated distances. If any final candidate sections overlap (for example, if both a first section and a slightly phase-shifted version of the first section are similar to the user-selected section), then the overlapping candidate section that is closest to the user-selected section can remain in the list of final candidate sections while the farther overlapping candidate section is removed from the list of final candidate sections.

At block 843, indications of the final candidate sections can be transmitted to a user for display. For example, with respect to FIGS. 1 and 3, the indications of the final candidate sections can be transmitted to a user system 107, and a display device 113 can display time intervals 1, 2, and 3 as shown in FIG. 3.

Multi-Graph Searching

The techniques disclosed herein can be used to search for other sections of a graph that look similar to a user-selected section of the graph. The techniques disclosed herein can also be used to search for other sections of different graphs that look similar to a user-selected section of a first graph.

The techniques disclosed herein can further be used to search for pair (or triplet, or other plurality) of sections of graphs that look similar to user-selected sections of a pair (or triplet, or other plurality) of graphs. For example, an electrician may want to automatically monitor a circuit that previously experienced problems shortly after a voltage reading showed a first waveform and a current reading simultaneously showed a second waveform. However, the circuit did not experience problem when only one, and not both, of the voltage and current readings showed the first or second waveform, respectively. The electrician may set up streaming sensors to monitor the voltage and current of the device and desire to be alerted when both the voltage and current of the circuit show patterns similar to the first and second waveforms, respectively.

FIG. 9 shows an example user interface 900 for searching for pairs of graph features similar to a selected pair of graph features. The user interface includes a first graph 901 of data series "S2" taken on Jan. 1, 2020, a second graph 903 of a data series "S3" taken on Jan. 1, 2020, a first user-selected section 905 of S2, a second user-selected section 907 of S3, details 911 of the selected sections 905 and 907, a search menu 913, a search button 915, and an alert menu 917.

A user can add a plurality of graphs of one or more plots to the user interface 900. Then, the user can select a plurality of sections (such as 905, 907) in the plurality of graphs. In the example shown, the graphs are of time series data, and the selected sections include the same time domain from about 4:22 to 4:48. In various embodiments, the x-axis domain can be the same or different for the plurality of graphs.

A menu 913 can be used to select pairs of graphs to search for pairs of sections similar to the selected pair of sections 905, 907. A first pair of dropdown menus labeled with "1" allows a user to select among data series stored in a database, such as the first database 121 shown in FIG. 1. The user can select a data series (e.g., S1, S2, S3, . . . Sn) by name. The user can also select categories of data series (e.g., a voltage data series and current data series). The user can also specify a date range (e.g., all graphs on 2020 Jan. 2). The user can also input various other search, restriction, and filtering criteria. The selected data series in the pair can be searched for a feature similar to the user-selected section 905, and the second selected data series in the pair can be searched for a feature similar to the user-selected section 907. Additional pairs (e.g,. pair "2") can also be searched.

The user can then click the button 915 to search the selected pairs of data series (or category pairs of data series, or data series within the date ranges, etc.). In response to the user search request, the techniques disclosed above can be extended to search a plurality of graphs. For example, candidate sections of a first graph can be found that match the user-selected section 905, and candidate sections of a second graph can be found that match the user-selected section 907, and the results can include candidate sections common to both the first graph and the second graph.

In some embodiments, when performing searches on more than one graph at a time, each graph can be individually analyzed against a respective user-selected section as shown in FIG. 8. In some embodiments, at block 841, confirming, re-ranking, and/or de-duplicating the final candidate sections can be performed based on the direct distance computation results for individual graphs. In some embodiments, at block 841, confirming, re-ranking, and/or de-duplicating the final candidate sections can be performed based on the sum of the direct distance computation results a plurality of graphs.

The user can also set alerts using the alert settings menu 917. For example, at a power plant, the menu 913 can be used to select a first data stream for voltage and a second data stream for current 907. The voltage and current sensors may sample data at hundreds or thousands of readings per second or at speeds too fast for a computer to keep up with when performing direct comparisons without applying the teachings disclosed herein. Using the techniques disclosed above, the processor can process and compare the streaming voltage and current data to the user-selected section 905 and 907 while keeping up with the rate of the data stream in a computationally efficient manner. If sections that look similar to the user-selected sections 905, 907 are detected together, than an alert can be generated to warn the user, or other actions can be taken.

In some embodiments, streamed data can be cached in a temporary database (not shown in FIG. 1). In real-world applications, recently streamed data can be of greater interest than historical data. Accordingly, the recently stored data can be cached for easy display, access, and searching. In various embodiments, a few minutes, hours, days, or weeks of data can be cached in the temporary database and transferred to a longer term storage database according to a first in first out policy.

Additional Examples

In some embodiments, the techniques discussed herein can be used, after receiving a user-selected section of a graph, to search about 4 million data points to find five similarly looking sections in less than two seconds. In various embodiments, a user can select to perform a search for similarly looking sections that are the closest in time to a user-selected section. In response to such a search option, candidate sections can be ranked based at least in part on a time difference (or x-axis difference) between the candidate sections and the user-selected section.

In some embodiments, the user can select other search options. For example, if a user is more interested in a shape of a graph rather than values, the user can select a search option. In processing the search request, comparisons of vector terms such as $y_{min}$, $y_{max}$, and $C_0$ can be given reduced weighting or ignored completely.

In some embodiments, a user can search for various numbers of results, such as searching for 5, 10, or 100 visually similar graph sections. The searches can be handled using different criteria by the back-end system. For example, in a single graph, to find the five closest looking sections, a number of candidates can be refined (e.g., at block 829 or 841) to drop candidates that do not fall within minimum similarity thresholds. However, when searching a single graph to find the 100 closest looking sections, there may not be enough remaining final candidates if the minimum similarity thresholds are applied at blocks 829 and 841. Accordingly, confirming that candidates sections fall within minimum similarity thresholds can be skipped. In some embodiments, various blocks in FIG. 8 can be modified or omitted based on the type of search performed.

In some embodiments, a search can sort the search results in order of the most to least similar, or in order from closest in time (or x-axis variable) to the user-selected section to farthest.

In some embodiments, the graphs shown in FIG. 2, FIG. 3, and FIG. 9 can be interactive. A user can selection sections of the graph to zoom in or out of. A user can add or remove graphs of data series from being shown. A user can also click on a search result (e.g., in FIG. 3) to show or zoom into a graph of the search result.

In some embodiments, data can be repeatedly received. For example, as shown in FIG. 1, a plurality of sensors 103 may constantly monitor a mission-critical component of infrastructure, machinery, safety measurements, etc. New sensor data can be streamed and analyzed, and alerts can be generated. New data from the sensors can be stored in the first database 123. Periodically or repeatedly (such as overnight), new vectors representing the new data can be determined and stored in the second database 125. Periodically or repeatedly (such as overnight), the search indexes can also be updated or rebuilt based on the new vectors or new data.

A first time series data can be compared against a second time series data that has data taken at different frequencies (e.g., 2 times per second and 1 time per second) by adjusting one of the frequencies. In some embodiments, data values for the slower sample data series can be extrapolated to a higher frequency. In some embodiments, the faster sampled data series can be resampled at the slower frequency. In some embodiments, the techniques described for times series data can be applied to a series of any other type of data, such as any X, Y coordinate data.

Additional Implementation Details and Embodiments

In an implementation, the data center 109 (or one or more aspects of the data center 109) may comprise, or be implemented in, a "virtual computing environment". As used herein, the term "virtual computing environment" should be construed broadly to include, for example, computer readable program instructions executed by one or more processors (e.g., as described in the example of FIG. 10) to implement one or more aspects of the modules and/or functionality described herein. Further, in this implementation, one or more modules/engines/etc. of the data center 109 may be understood as comprising one or more rules engines of the virtual computing environment that, in response to inputs received by the virtual computing environment, execute rules and/or other program instructions to modify operation of the virtual computing environment. For example, a request received from the user computing device 107 may be understood as modifying operation of the virtual computing environment to cause the request access to a resource from the data center 109. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the data center 109. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the data center 109 as a virtual computing environment may advantageously enable executing different aspects or modules of the system on different computing devices or processors, which may increase the scalability of the system. Implementing one or more aspects of the data center 109 as a virtual computing environment may further advantageously enable sandboxing various aspects, data, or modules of the system from one another, which may increase security of the system by preventing, e.g., malicious intrusion into the system from spreading. Implementing one or more aspects of the data center 109 as a virtual computing environment may further advantageously enable parallel execution of various aspects or modules of the system, which may increase the scalability of the system. Implementing one or more aspects of the data center 109 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The one or more hardware processors can include one or more processors in a computing device, one or more processors distributed in plurality of computing devices, and/or one or more processors in cloud computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
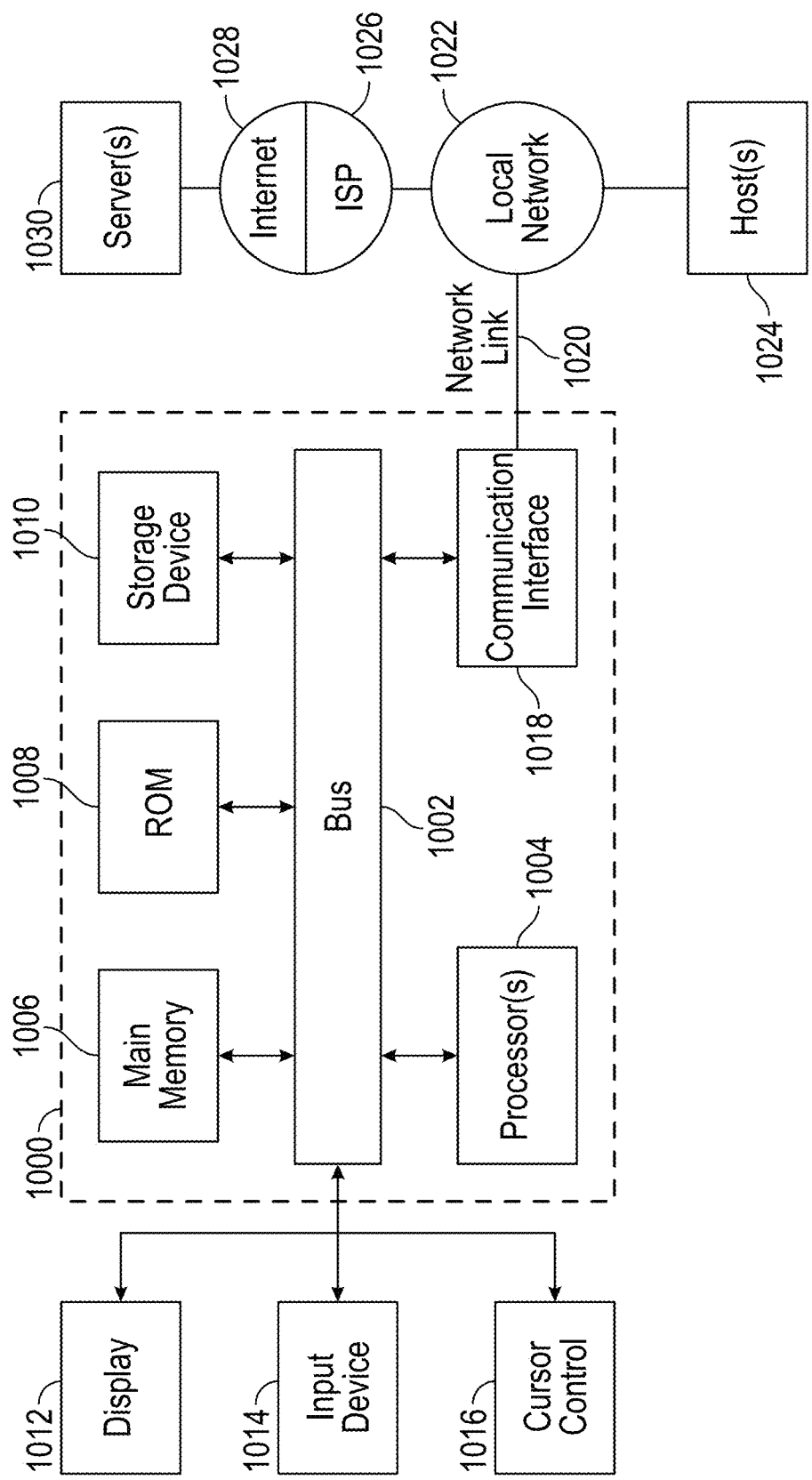
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

The network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

The computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
one or more hardware computer processors configured to execute computer executable instructions to cause the system to:
generate a first plurality of vectors that represent first sections of stored series data;
generate a second plurality of vectors that represent the stored series data at a finer resolution than represented by the first plurality of vectors;
cause display, on a user computer, of an interactive graphical user interface including a selectable visualization of at least a portion of the stored series data;
receive, from the user computer and via the interactive graphical user interface, a selection of first series data from the selectable visualization;
determine, by reference to both the first plurality of vectors and the second plurality of vectors, at least a first candidate section of the stored series data having a similarity with the selection of first series data, wherein the second plurality of vectors are used to refine the determination of the first candidate section; and
transmit, for display on the user computer and in the interactive graphical user interface, at least an indication of the first candidate section in the selectable visualization.

2. The system of claim 1, wherein said determining at least the first candidate section of the stored series data having the similarity with the selection of first series data comprises:
determining a first vector from the first plurality of vectors and representing at least a first portion of the selection of first series data; and
performing first one or more comparisons to determine at least the first candidate section of the stored series data, the first one or more comparisons including at least a first comparison of some of the first plurality of vectors against the first vector.

3. The system of claim 2, wherein said determining at least the first candidate section of the stored series data having the similarity with the selection of first series data further comprises:
determining a second vector from the second plurality of vectors and representing at least a second portion of the selection of first series data; and
performing second one or more comparisons to further determine at least the first candidate section of the stored series data, the second one or more comparisons including at least a second comparison of some of the second plurality of vectors against the second vector.

4. The system of claim 3, wherein said performing second one or more comparisons comprises:
determining a subset of the second plurality of vectors that are adjacent to a vector from the first plurality of vectors.

5. The system of claim 2, wherein the first one or more comparisons are performed by referencing an index.

6. The system of claim 5, wherein the one or more hardware computer processors are further configured to execute computer executable instructions to cause the system to:
generate the index based at least in part on a nearest neighbor computation or distance computation.

7. The system of claim 1, wherein the first plurality of vectors include:
coefficients of results of a mathematical transformation of the first sections of stored series data; and
a normalization index.

8. The system of claim 7, wherein generating the first plurality of vectors comprises performing a mathematical transform that includes at least one of: a Fourier transform, Chebyshev transform, or polynomial approximation.

9. The system of claim 8, wherein the one or more hardware computer processors are further configured to execute computer executable instructions to cause the system to:
perform a reverse transform of the mathematical transform to construct an approximation of at least the first candidate section using vector data.

10. The system of claim 1, wherein the first series data is the stored series data.

11. The system of claim 1, wherein the one or more hardware computer processors are further configured to execute computer executable instructions to cause the system to:
compare the selection of the first series data to a candidate section; and
compare the selection of the first series data to an offset section, wherein the offset section begins at a shifted time that is offset from a beginning time of the candidate section, and the shifted time is less than a time span of the candidate section.

12. The system of claim 11, wherein:
comparing the selection of the first series data to the candidate section comprises calculating a first distance, deviation, or other statistical metric; and
comparing the selection of the first series data to the offset section comprises calculating a second distance, deviation, or other statistical metric.

13. A computer-implemented method comprising:
by one or more hardware computer processors executing computer executable instructions:
generating a first plurality of vectors that represent first sections of stored series data;
generating a second plurality of vectors that represent the stored series data at a finer resolution than represented by the first plurality of vectors;
causing display, on a user computer, of an interactive graphical user interface including a selectable visualization of at least a portion of the stored series data;
receiving, from the user computer and via the interactive graphical user interface, a selection of first series data from the selectable visualization;
determining, by reference to both the first plurality of vectors and the second plurality of vectors, at least a first candidate section of the stored series data having a similarity with the selection of first series data, wherein the second plurality of vectors are used to refine the determination of the first candidate section; and transmitting, for display on the user computer and in the interactive graphical user interface, at least an indication of the first candidate section in the selectable visualization.

14. The computer-implemented method of claim 13, wherein said determining at least the first candidate section of the stored series data having the similarity with the selection of first series data comprises:

determining a first vector from the first plurality of vectors and representing at least a first portion of the selection of first series data; and performing first one or more comparisons to determine at least the first candidate section of the stored series data, the first one or more comparisons including at least a first comparison of some of the first plurality of vectors against the first vector.

15. The computer-implemented method of claim 14, wherein said determining at least the first candidate section of the stored series data having the similarity with the selection of first series data further comprises:

determining a second vector from the second plurality of vectors and representing at least a second portion of the selection of first series data; and performing second one or more comparisons to further determine at least the first candidate section of the stored series data, the second one or more comparisons including at least a second comparison of some of the second plurality of vectors against the second vector.

16. The computer-implemented method of claim 15, wherein said performing second one or more comparisons comprises:

determining a subset of the second plurality of vectors that are adjacent to a vector from the first plurality of vectors.

17. The computer-implemented method of claim 14, wherein the first one or more comparisons are performed by referencing an index, and wherein the computer-implemented method further comprises:

by the one or more hardware computer processors executing computer executable instructions:

generating the index based at least in part on a nearest neighbor computation or distance computation.

18. The computer-implemented method of claim 13, wherein the first plurality of vectors include:

coefficients of results of a mathematical transformation of the first sections of stored series data; and a normalization index.

19. The computer-implemented method of claim 18, wherein generating the first plurality of vectors comprises performing a mathematical transform that includes at least one of: a Fourier transform, Chebyshev transform, or polynomial approximation.

20. The computer-implemented method of claim 19 further comprising:

by one or more hardware computer processors executing computer executable instructions:

performing a reverse transform of the mathematical transform to construct an approximation of at least the first candidate section using vector data.

* * * * *